(12) United States Patent
Pi et al.

(10) Patent No.: US 7,885,176 B2
(45) Date of Patent: Feb. 8, 2011

(54) METHODS AND APPARATUS FOR MAPPING MODULATION SYMBOLS TO RESOURCES IN OFDM SYSTEMS

(75) Inventors: Zhouyue Pi, Richardson, TX (US); Farooq Khan, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 240 days.

(21) Appl. No.: 12/076,938

(22) Filed: Mar. 25, 2008

(65) Prior Publication Data

US 2008/0298224 A1 Dec. 4, 2008

Related U.S. Application Data

(60) Provisional application No. 60/924,861, filed on Jun. 1, 2007.

(51) Int. Cl.
*H04J 9/00* (2006.01)
(52) U.S. Cl. .................................. 370/204; 370/330
(58) Field of Classification Search ......... 370/203–210, 370/328–339
See application file for complete search history.

(56) References Cited

U.S. PATENT DOCUMENTS

2008/0095106 A1* 4/2008 Malladi et al. .............. 370/329

OTHER PUBLICATIONS

3GPP TR 25.814 V7.0.0, evolved Universal Terrestrial Radio Access (UTRA), 126 pages, 2006.*
Kawamura et al, Layer 1 / Layer 2 Control Channel Structure in Single-Carrier FDMA Based Evolved UTRA Uplink, IEEE, 5 pages, 2007.*
R1-070790, Support of Precoding for E-UTRA DL L1/L2 Control Channel, Motorola, 3 pages, Feb. 2007.*
R1-070787, E-UTRA DL L1/L2 Control Channel Design, Motorola, 8 pages, Feb. 2007.*

* cited by examiner

*Primary Examiner*—Frank Duong

(57) ABSTRACT

A method for transmission, by dividing a transmission resource in a time domain subframe into a plurality of equal duration resource elements in a time and frequency domain, segregating the plurality of resource elements into a plurality of resource regions, modulating information to be transmitted to generate a sequence of modulation symbols at a transmitter, mapping the sequence of modulation symbols into the plurality of resource elements in the plurality of resource regions, and transmitting the modulation symbols via a plurality of antennas using the respective corresponding resource elements to a receiver. The mapping of the modulation symbols in at least one resource region is independent of a certain control channel information that is carried in said time domain subframe, and the mapping of the modulation symbols in at least another resource region is dependent upon said certain control channel information that is carried in said subframe. The information to be transmitted may be encoded to generate a plurality of code blocks, with roughly equal number of resource elements assigned to each of the plurality of code blocks in at least one resource region. Alternatively, the time domain subframe may contain only one resource region.

46 Claims, 16 Drawing Sheets

METHODS AND APPARATUS FOR MAPPING MODULATION SYMBOLS TO RESOURCES IN OFDM SYSTEMS

CLAIM OF PRIORITY

This application makes reference to, incorporates the same herein, and claims all benefits accruing under 35 U.S.C. §119 from a provisional application earlier filed in the U.S. Patent & Trademark Office on 1 Jun. 2007 and there duly assigned Ser. No. 60/924,861.

BACKGROUND OF THE INVENTION

1. Field of the Invention

The present invention relates to a method for mapping modulation symbols to resources in a communication system, and more specifically, a method for mapping modulation symbols into different resource regions in a communication system, and another method for mapping modulation symbols of multiple code blocks into resources in a communication system.

2. Description of the Related Art

Telecommunication enables transmission of data over a distance for the purpose of communication between a transmitter and a receiver. The data is usually carried by radio waves and is transmitted using a limited transmission resource. That is, radio waves are transmitted over a period of time using a limited frequency range.

In a contemporary communication system, the information to be transmitted are first encoded and then modulated to generate multiple modulation symbols. The symbols are subsequently mapped into transmission resource. Usually, the transmission resource available for data transmission is segmented into a plurality of equal duration time and frequency slots, so called resource elements. A single resource element or multiple resource elements may be allocated for transmitting the data. When data is transmitted, a control signal may accompany the data to carry information regarding the allocation of the resource elements for the current data transmission. Therefore, when a receiver receives the data and the control signal, the receiver may derive the information regarding resource allocation used for data transmission from the control signal and decodes the received data using the derived information.

In Third ($3^{rd}$) Generation Partnership Project Long Term Evolution (3GPP LTE) systems, certain resource elements are allocated for control signal transmission. Therefore, the data symbols may be mapped into the resource elements that are not allocated for control signal transmission. Each data transmission carries information bits of one or multiple transport blocks. When a transport block is larger than the largest code block size, the information bits in a transport block may be segmented into multiple code blocks. The process of dividing the information bits in a transport block into multiple code blocks is called code block segmentation. Due to the limited selection of code block sizes and the attempt to maximize packing efficiency during the code block segmentation, the multiple code blocks of a transport block may have different sizes. Each code block will be encoded, interleaved, rate matched, and modulated. Therefore, the data symbols for a transmission may consist of modulation symbols of multiple code blocks.

SUMMARY OF THE INVENTION

It is therefore an object of the present invention to provide an improved method for transmission.

It is another object to provide an improved mapping scheme for map modulation symbols.

According to one aspect of the present invention, a method for transmission may be provided to divide a transmission resource in a subframe into a plurality of equal duration resource elements in time and frequency domain, segregate the plurality of resource elements into one or a plurality of resource regions, modulate information to be transmitted to generate a sequence of modulation symbols at a transmitter, map the sequence of modulation symbols into the plurality of resource elements in the plurality of resource regions, and transmitting the modulation symbols via one or a plurality of antennas using the respective corresponding resource elements to a receiver. The mapping of the modulation symbols in at least one resource region, i.e., first resource region, is independent of a certain control channel information that is carried in said time domain subframe, and the mapping of the modulation symbols in at least another resource region, i.e., second resource region, is dependent upon said certain control channel information that is carried in said subframe.

The certain control channel information may be a control channel format indication.

The method may further include interleaving the sequence of modulation symbols before mapping the modulation symbols into the resource elements.

The sequence of modulation symbols may be sequentially mapped into resource elements within a plurality of multiplexing symbols in the resource regions starting from a multiplexing symbol having a smallest index in the time domain. One example of a multiplexing symbol is an OFDM symbol in an Orthogonal Frequency Division Multiplex (OFDM) system.

The mapping of the sequence of modulation symbols may start from the resource elements within the at least one first resource region. If the number of the modulation symbols is more than the resource elements in the at least one first resource region, the remaining modulation symbols may be mapped into the resource elements within the at least one second resource region.

The multiplexing symbols may be mapped in each resource region in an increasing order starting from a multiplexing symbol having a smallest index in the time domain in that resource region.

After mapping the modulation symbols into the resource elements within the multiplexing symbols, the modulation symbols within each multiplexing symbols may be interleaved in the frequency domain.

Alternatively, in the first resource region, the multiplexing symbols may be mapped in a decreasing order, and in the second resource region, the multiplexing symbols may be mapped in an increasing order.

Still alternatively, in the first resource region, the multiplexing symbols may be mapped in an increasing order, and in the second resource region, the multiplexing symbols may be mapped in a decreasing order.

The method may further include calculating the number of available resource elements in the at least one first resource region to obtain a first number, calculating the number of available resource elements in the at least one second resource region to obtain a second number, mapping the first number of modulation symbols into the resource elements within the at least one first resource region, and mapping the second number of modulation symbols into the resource elements within the at least one second resource region.

The method may further include transmitting a control channel signal carrying said certain control channel information via the transmitter to the receiver, decoding at the receiver the control channel signal to derive said certain control channel information, determining which resource elements within the at least one second resource region are used for the transmission of the modulation symbols, collecting the modulation symbols transmitted in a resource region selected from among the at least one first resource region to generate a first data packet, decoding the first data packet, determining whether the first data packet decodes, and if the decoding of the first data packet fails, recursively collecting the modulation symbols transmitted in said resource region and other resource regions selected from among the at least one first resource region and the at least one second resource region, and decoding the collected modulation symbols until the collected modulation symbols decodes.

If the decoding of the control channel signal fails, the receiver may recursively collect and decode the modulation symbols transmitted in said resource region and other resource regions selected from among the at least one first resource region until the collected modulation symbols decodes.

According to another aspect of the present invention, a method for transmission may include dividing a transmission resource in a subframe into a plurality of equal duration resource elements in a time and frequency domain, segmenting the information to be transmitted to generated a plurality of code blocks, each code block including a plurality of information bits with at least one code block containing a smaller number of information bits than at least another code block, encoding the code blocks to generate a plurality of coded bits, modulating the plurality of coded bits in the code blocks to generate a sequence of modulation symbols at a transmitter, assigning roughly equal number of resource elements to each of the plurality of code blocks with a slightly larger number of resource elements assigned to the code blocks with larger sizes and a slightly smaller number of resource elements assigned to the code blocks with smaller sizes, and transmitting the modulation symbols via one or a plurality of antennas using the respective corresponding resource elements to a receiver.

According to another aspect of the present invention, a method for transmission may include dividing a transmission resource in a time domain subframe into a plurality of equal duration resource elements in a time and frequency domain, segregating the plurality of resource elements into a plurality of resource regions, comprising at least one first resource region and at least one second resource region, each of the first resource regions and the second resource regions comprising at least one multiplexing symbol, each multiplexing symbol corresponding to a time slot, and each multiplexing symbol comprising a plurality of resource elements corresponding to respective frequency sub-carriers, segmenting the information to be transmitted to generated a plurality of code blocks, each code block including a plurality of information bits, encoding the code blocks to generate a plurality of coded bits, modulating the plurality of coded bits in the code blocks to generate a sequence of modulation symbols at a transmitter, mapping at least one modulation symbol in each code block into the resource elements in the at least one first resource region, with the mapping being independent of a certain control channel information that is carried in said time domain subframe, and transmitting the modulation symbols via a plurality of antennas using the respective corresponding resource elements to a receiver.

The method may further include mapping at least one modulation symbol in each code block into the resource elements in the at least one second resource region, with the mapping being dependent on the certain control channel information that is carried in said time domain subframe.

The method may further include assigning roughly equal number of resource elements in one of the at least one first resource region to each of the plurality of code blocks.

The method may further include assigning roughly equal number of resource elements in one of the at least one second resource region to each of the plurality of code blocks.

The method may further include assigning roughly equal number of coded bits in one of the at least one first resource region to each of the plurality of code blocks.

The method may further include assigning roughly equal number of coded bits in one of the at least one second resource region to each of the plurality of code blocks.

The method may further include assigning a selected number of resource elements in one of the at least one first resource region to each of the plurality of code blocks to obtain roughly equal coding rate among the plurality of code blocks.

The method may further include assigning a selected number of resource elements in one of the at least one second resource region to each of the plurality of code blocks to obtain roughly equal coding rate among the plurality of code blocks.

The method may further include assigning a selected number of coded bits in one of the at least one first resource region to each of the plurality of code blocks to obtain roughly equal coding rate among the plurality of code blocks.

The method may further include assigning a selected number of coded bits in one of the at least one second resource region to each of the plurality of code blocks to obtain roughly equal coding rate among the plurality of code blocks.

According to still another aspect of the present invention, a transmitter may be constructed with a modulator modulating information to be transmitted into a plurality of modulation symbols, a mapping unit mapping the plurality of modulation symbols into a plurality of resource elements in a time domain subframe, with the time domain subframe comprising a plurality of resource regions, with the mapping of the modulation symbols in at least one resource region being independent of a certain control channel information, and a plurality of transmitters for transmitting the modulation symbols using the corresponding resource elements.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
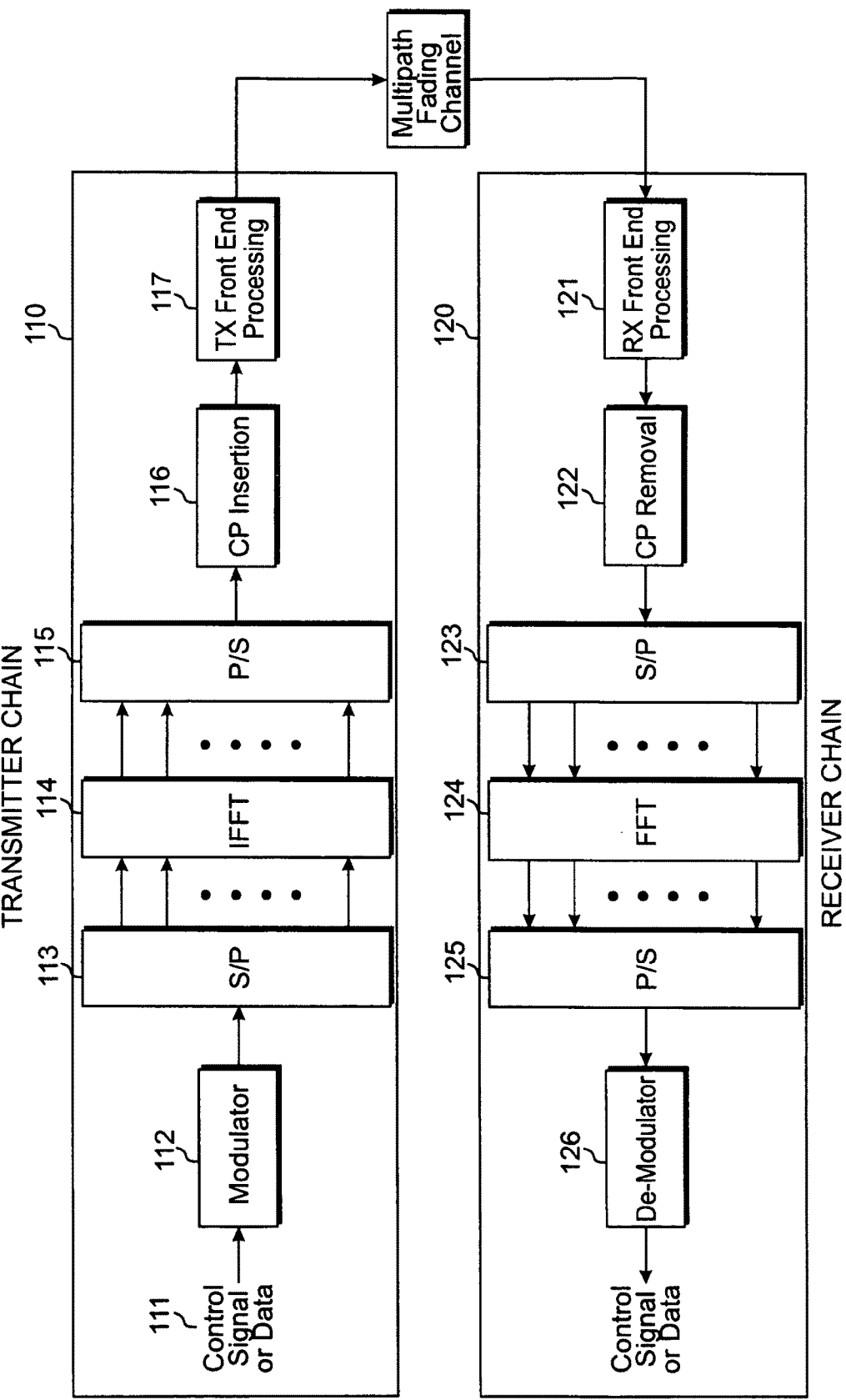
FIG. 1 is an illustration of an Orthogonal Frequency Division Multiplexing (OFDM) transceiver chain suitable for the practice of the principles of the present invention.

FIG. 1 illustrates an Orthogonal Frequency Division Multiplexing (OFDM) transceiver chain. In a communication system using OFDM technology, at transmitter chain 110, control signals or data 111 is modulated by modulator 112 into a series of modulation symbols, that are subsequently serial-to-parallel converted by Serial/Parallel (S/P) converter 113. Inverse Fast Fourier Transform (IFFT) unit 114 is used to transfer the signals from frequency domain to time domain into a plurality of OFDM symbols. Cyclic prefix (CP) or zero prefix (ZP) is added to each OFDM symbol by CP insertion unit 116 to avoid or mitigate the impact due to multipath fading. Consequently, the signal is transmitted by transmitter (Tx) front end processing unit 117, such as an antenna (not shown), or alternatively, by fixed wire or cable. At receiver chain 120, assuming perfect time and frequency synchronization are achieved, the signal received by receiver (Rx) front end processing unit 121 is processed by CP removal unit 122. Fast Fourier Transform (FFT) unit 124 transfers the received signal from time domain to frequency domain for further processing.

Figure 2:
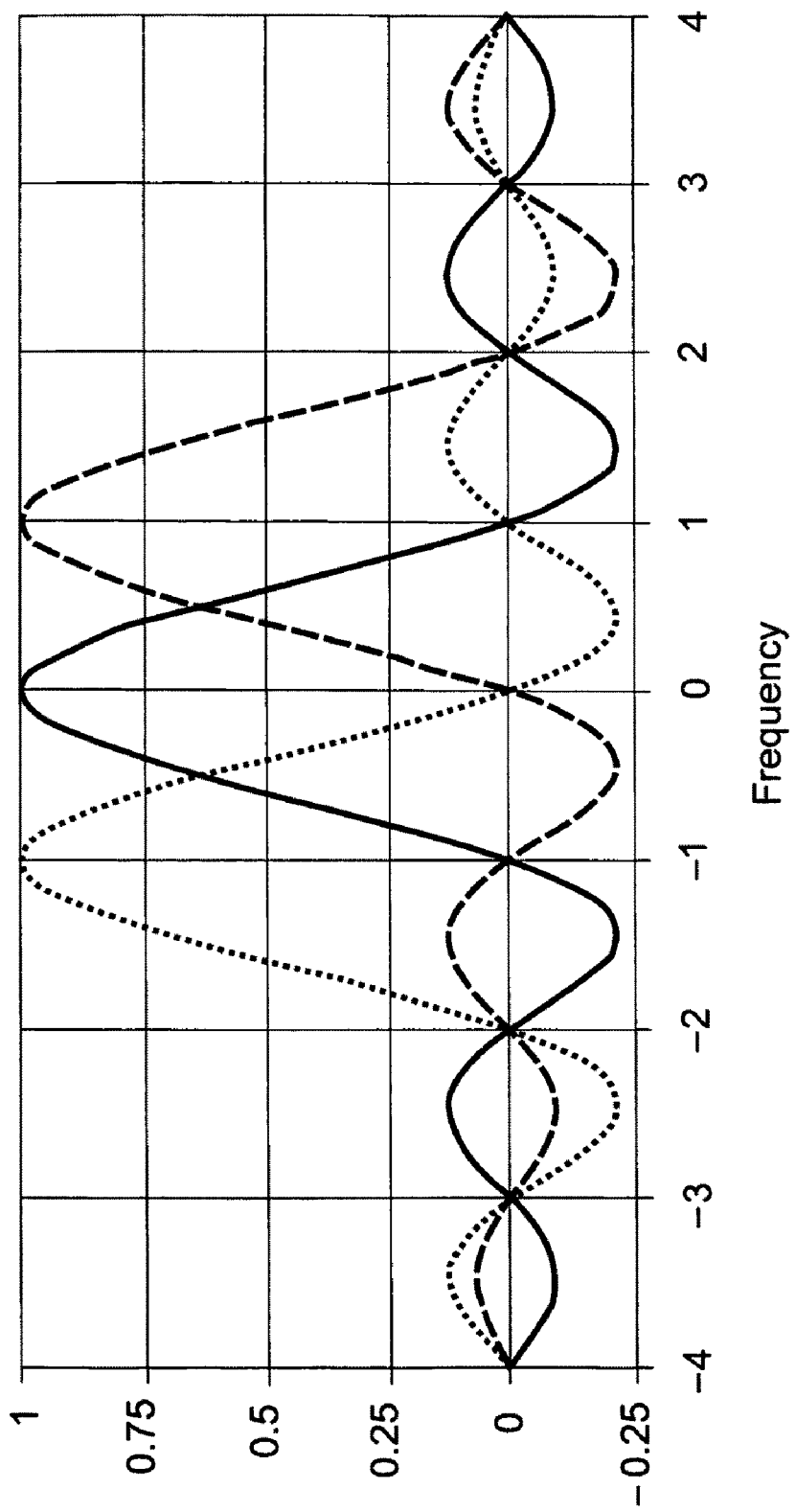
FIG. 2 is an illustration of OFDM subcarriers.

In a OFDM system, each OFDM symbol consists of multiple sub-carriers. Each sub-carrier within an OFDM symbol carriers a modulation symbol. FIG. 2 illustrates the OFDM transmission scheme using sub-carrier 1, sub-carrier 2, and sub-carrier 3. Because each OFDM symbol has finite duration in time domain, the sub-carriers overlap with each other in frequency domain. The orthogonality is maintained at the sampling frequency assuming the transmitter and the receiver has perfect frequency synchronization, as shown in FIG. 2. In the case of frequency offset due to imperfect frequency synchronization or high mobility, the orthogonality of the sub-carriers at sampling frequencies is destroyed, resulting in inter-carrier-interference (ICI).

Figure 3:
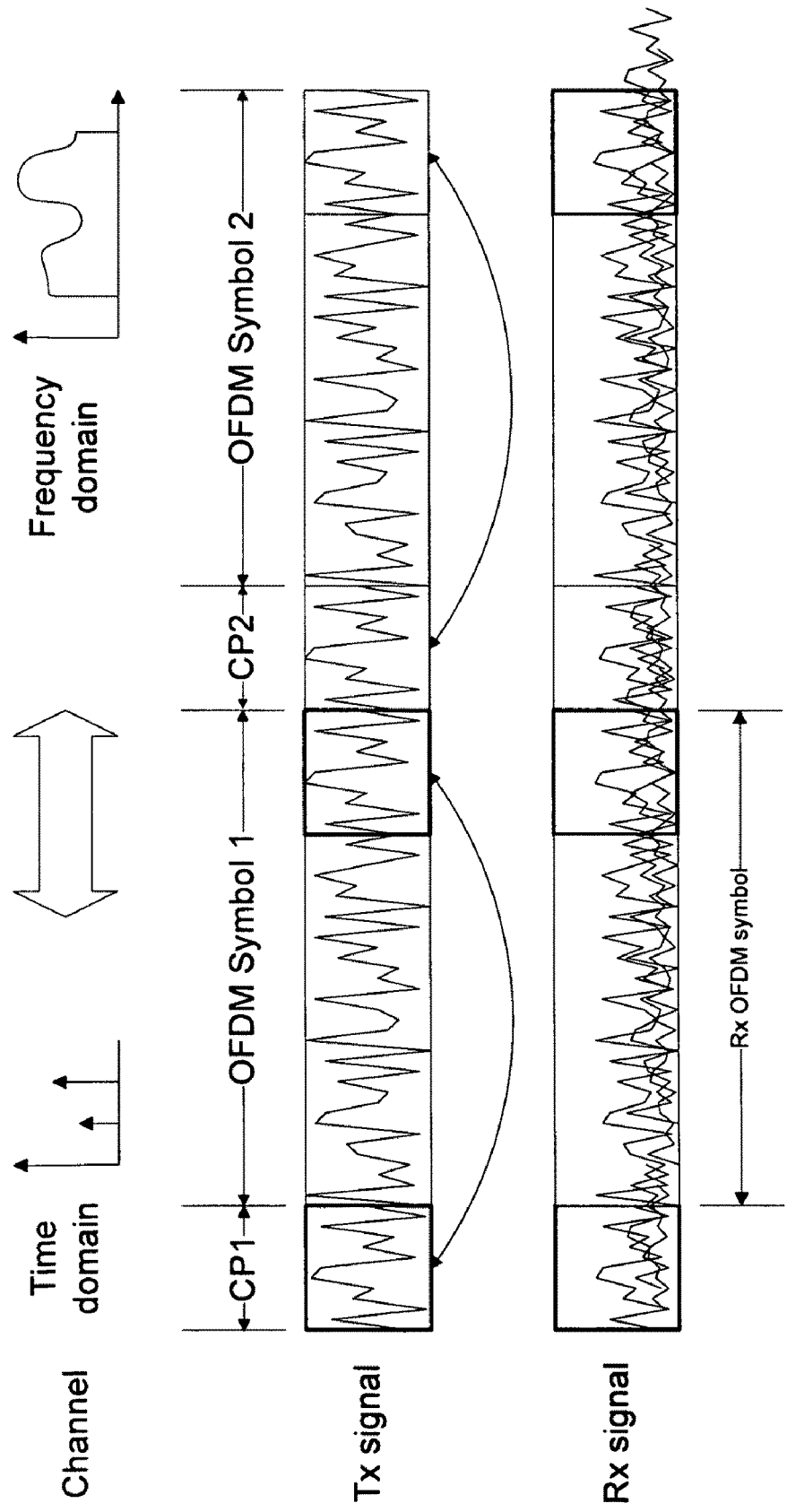
FIG. 3 is an illustration of OFDM symbols in a time domain.

A time domain illustration of the transmitted and received OFDM symbols is shown in FIG. 3. Due to multipath fading, the CP portion of the received signal is often corrupted by the previous OFDM symbol. However, as long as the CP is sufficiently long, the received OFDM symbol without CP should only contain its own signal convoluted by the multipath fading channel. In general, a Fast Fourier Transform (FFT) is taken at the receiver side to allow further processing frequency domain. The advantage of OFDM over other transmission schemes is its robustness to multipath fading. The multipath fading in time domain translates into frequency selective fading in frequency domain. With the cyclic prefix or zero prefix added, the inter-symbol-interference between adjacent OFDM symbols are avoided or largely alleviated. Moreover, because each modulation symbol is carried over a narrow bandwith, it experiences a single path fading. Simple equalization scheme can be used to combat frequency selection fading.

Figure 4:
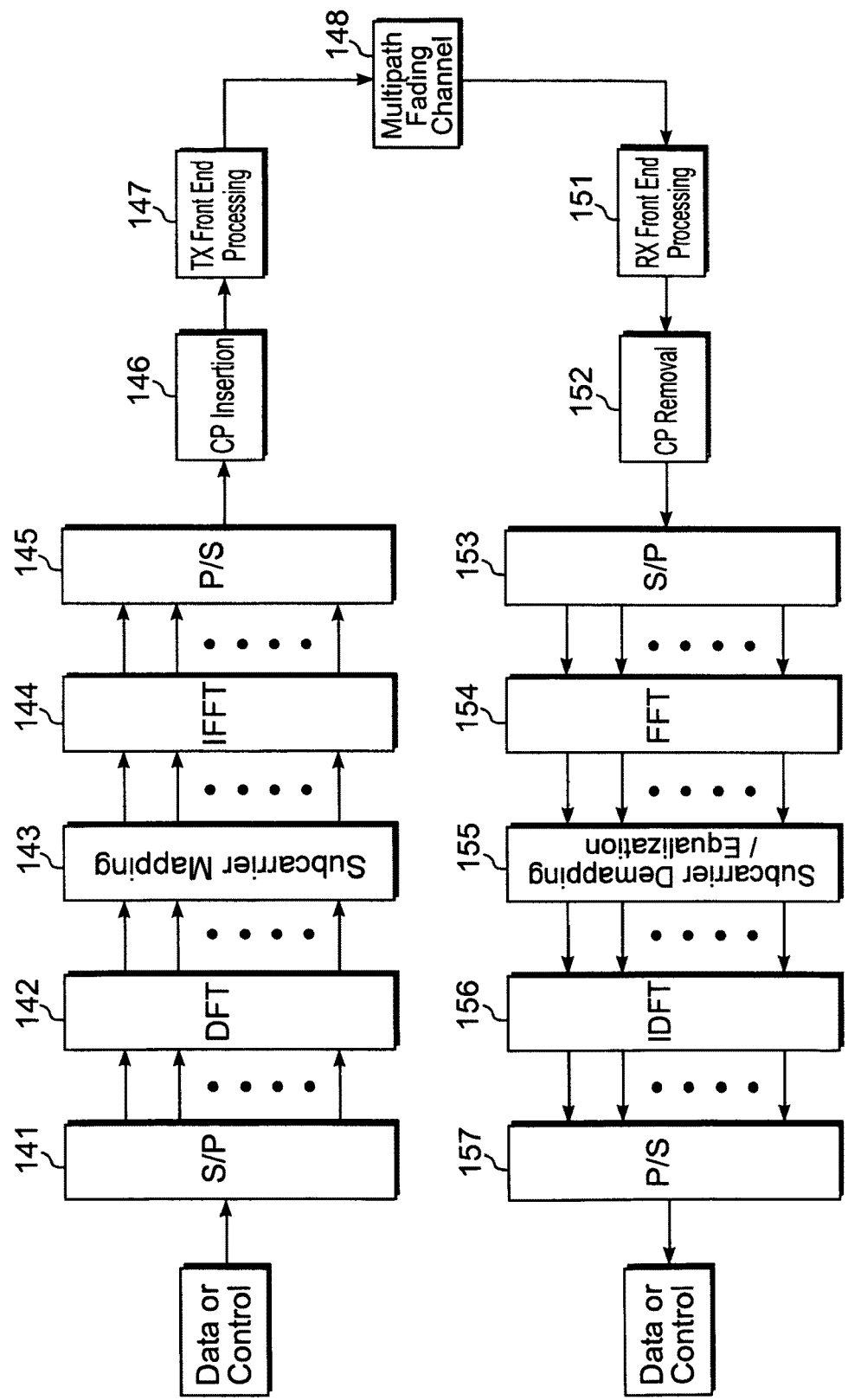
FIG. 4 is an illustration of single carrier frequency division multiple access transceiver chain.

Single carrier frequency division multiple access (SC-FDMA), which utilizes single carrier modulation and frequency domain equalization is a technique that has similar performance and complexity as those of an OFDMA system. One advantage of SC-FDMA is that the SC-FDMA signal has lower peak-to-average power ratio (PAPR) because of its inherent single carrier structure. Low PAPR normally results in high efficiency of power amplifier, which is particularly important for mobile stations in uplink transmission. SC-FDMA is selected as the uplink multiple access scheme in 3GPP long term evolution (LTE). An example of the transceiver chain for SC-FDMA is shown in FIG. 4. At the transmitter side, the data or control signal is serial to parallel (S/P) converted by a S/P convertor 181. Discrete Fourier transform (DFT) will be applied to time-domain data or control signal by a DFT transformer 182 before the time-domain data is mapped to a set of sub-carriers by a sub-carrier mapping unit 183. To ensure low PAPR, normally the DFT output in the frequency domain will be mapped to a set of contiguous sub-carriers. Then IFFT, normally with larger size than the DFT, will be applied by an IFFT transformer 184 to transform the signal back to time domain. After parallel to serial (P/S) convertion by a P/SI converter 185, cyclic prefix (CP) will be added by a CP insertion unit 186 to the data or the control signal before the data or the control signal is transmitted to a transmission front end processing unit 187. The processed signal with a cyclic prefix added is often referred to as a SC-FDMA block. After the signal passes through a communication channel 188, e.g., a multipath fading channel in a wireless communication system, the receiver will perform receiver front end processing by a receiver front end processing unit 191, remove the CP by a CP removal unit 192, apply FFT by a FFT transformer 194 and frequency domain equalization. Inverse Discrete Fourier transform (IDFT) 196 will be applied after the equalized signal is demapped 195 in frequency domain. The output of IDFT will be passed for further time-domain processing such as demodulation and decoding.

In packet-based wireless data communication systems, control signals transmitted through control channels, i.e., control channel transmission, generally accompany data signals transmitted through data channels, i.e., data transmission. Control channel information, including control channel format indicator (CCFI), acknowledgement signal (ACK), packet data control channel (PDCCH) signal, carries transmission format information for the data signal, such as user ID, resource assignment information, Payload size, modulation, Hybrid Automatic Repeat-reQuest (HARQ) information, MIMO related information.

Hybrid Automatic Repeat reQuestion (HARQ) is widely used in communication systems to combat decoding failure and improve reliability. Each data packet is coded using certain forward error correction (FEC) scheme. Each subpacket may only contains a portion of the coded bits. If the transmission for subpacket k fails, as indicated by a NAK in a feedback acknowledgement channel, a retransmission subpacket, subpacket k+1, is transmitted to help the receiver decode the packet. The retransmission subpackets may contain different coded bits than the previous subpackets. The receiver may softly combine or jointly decode all the received subpackets to improve the chance of decoding. Normally, a maximum number of transmissions is configured in consideration of both reliability, packet delay, and implementation complexity.

Figure 5:
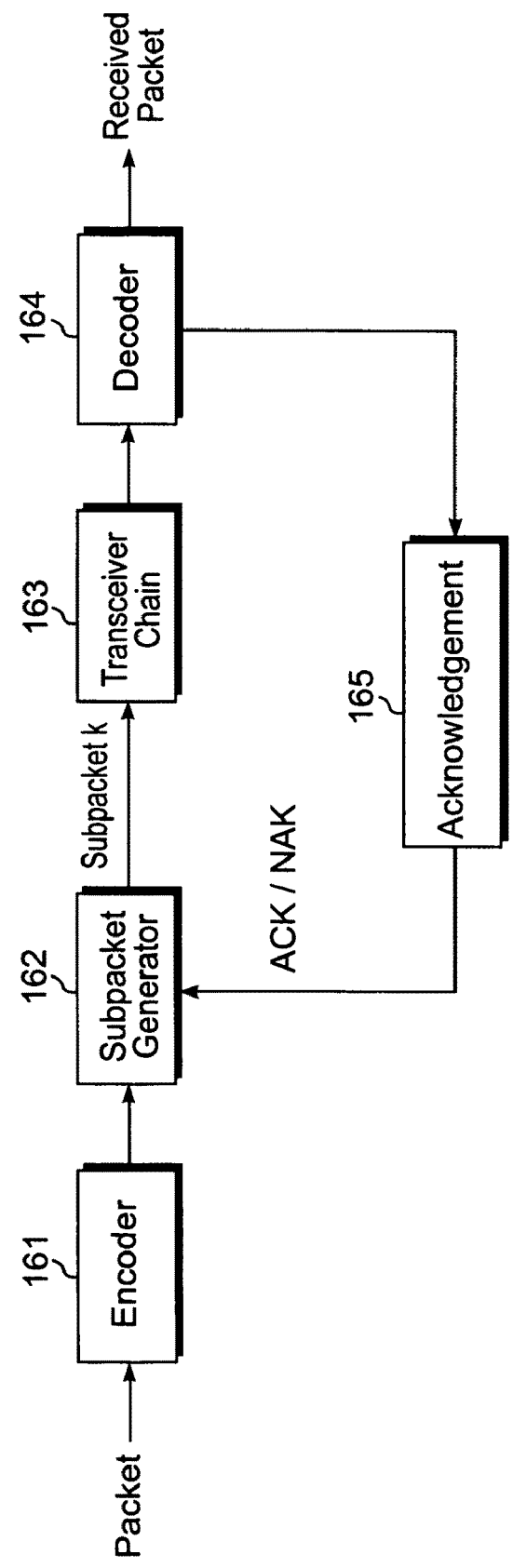
FIG. 5 is an illustration of a Hybrid Automatic Repeat request (HARQ) transceiver chain.

Due to its simplicity, N-channel synchronous HARQ are often used in wireless communication systems. For example, synchronous HARQ has been accepted as the HARQ scheme for LTE uplink in 3GPP. FIG. 5 shows an example of a 4-channel synchronous HARQ. Due to fixed timing relationship between subsequent transmissions, the transmission slots in the same HARQ channel exhibits an interlace structure. For example, interlace 0 consists of slot 0, 4, 8, . . . , 4k, . . . ; interlace 1 consists of slot 1, 5, 9, . . . , 4k+1, . . . ; interlace 2 consists of slot 2, 6, 10, . . . , 4k+2, . . . ; interlace 3 consists of slot 3, 7, 11, . . . 4k+3, . . . . Let's take interlace 0 as an example. A sub-packet is transmitted in slot 0. After correctly decoding the packet, the receiver sends back an ACK to the transmitter. The transmitter then can start a new packet at the next slot in this interlace, i.e., slot 4. However, the first subpacket transmitted in slot 4 is not correctly received. After the transmitter receives the NAK from the receiver, the transmitter transmits another sub-packet of the same packet at the next slot in this interlace, i.e., slot 8. Sometimes a receiver might have difficulty in detecting the packet boundary, i.e., whether a subpacket is the first sub-packet of a new packet or a retransmission sub-packet. To alleviate this problem, a new packet indicator may be transmitted in the control channel that carries transmission format information for the packet. Sometimes, a more elaborated version of HARQ channel information, such as sub-packet ID, or even HARQ channel ID, can be transmitted to help the receiver detect and decode the packet.

Multiple antenna communication systems, which is often referred to as multiple input multiple output (MIMO), are widely used in wireless communication to improve system performance. In a MIMO system, the transmitter has multiple antennas capable of transmitting independent signals and the receiver is equipped with multiple receive antennas. MIMO systems degenerates to single input multiple output (SIMO) if there is only one transmission antenna or if there is only one stream of data transmitted. MIMO systems degenerates to multiple input single output (MISO) if there is only one receive antenna. MIMO systems degenerates to single input single output (SISO) if there is only one transmission antenna and one receive antenna. MIMO technology can significant increase throughput and range of the system without any increase in bandwidth or overall transmit power. In general, MIMO technology increases the spectral efficiency of a wireless communication system by exploiting the additional dimension of freedom in the space domain due to multiple antennas. There are many categories of MIMO technologies. For example, spatial multiplexing schemes increase the transmission rate by allowing multiple data streaming transmitted over multiple antennas. Transmit diversity methods such as space-time coding take advantage of spatial diversity due to multiple transmit antennas. Receiver diversity methods utilizes the spatial diversity due to multiple receive antennas. Beamforming technologies improve received signal gain and reducing interference to other users. Spatial division multiple access (SDMA) allows signal streams from or to multiple users to be transmitted over the same time-frequency resources. The receivers can separate the multiple data streams by the spatial signature of these data streams. Note these MIMO transmission techniques are not mutually exclusive. In fact, many MIMO schemes are often used in an advanced wireless systems.

Figure 6:
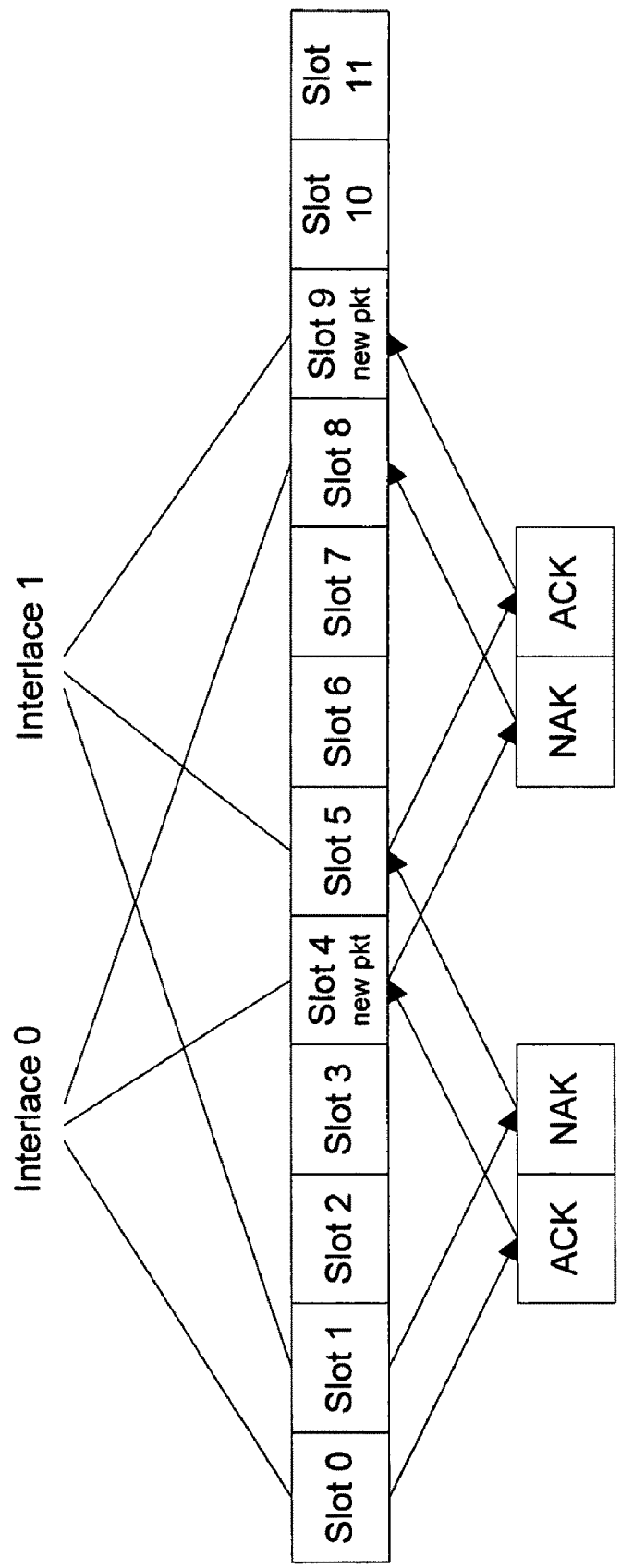
FIG. 6 is an illustration of a four-channel HARQ transmission scheme.
Figure 7:
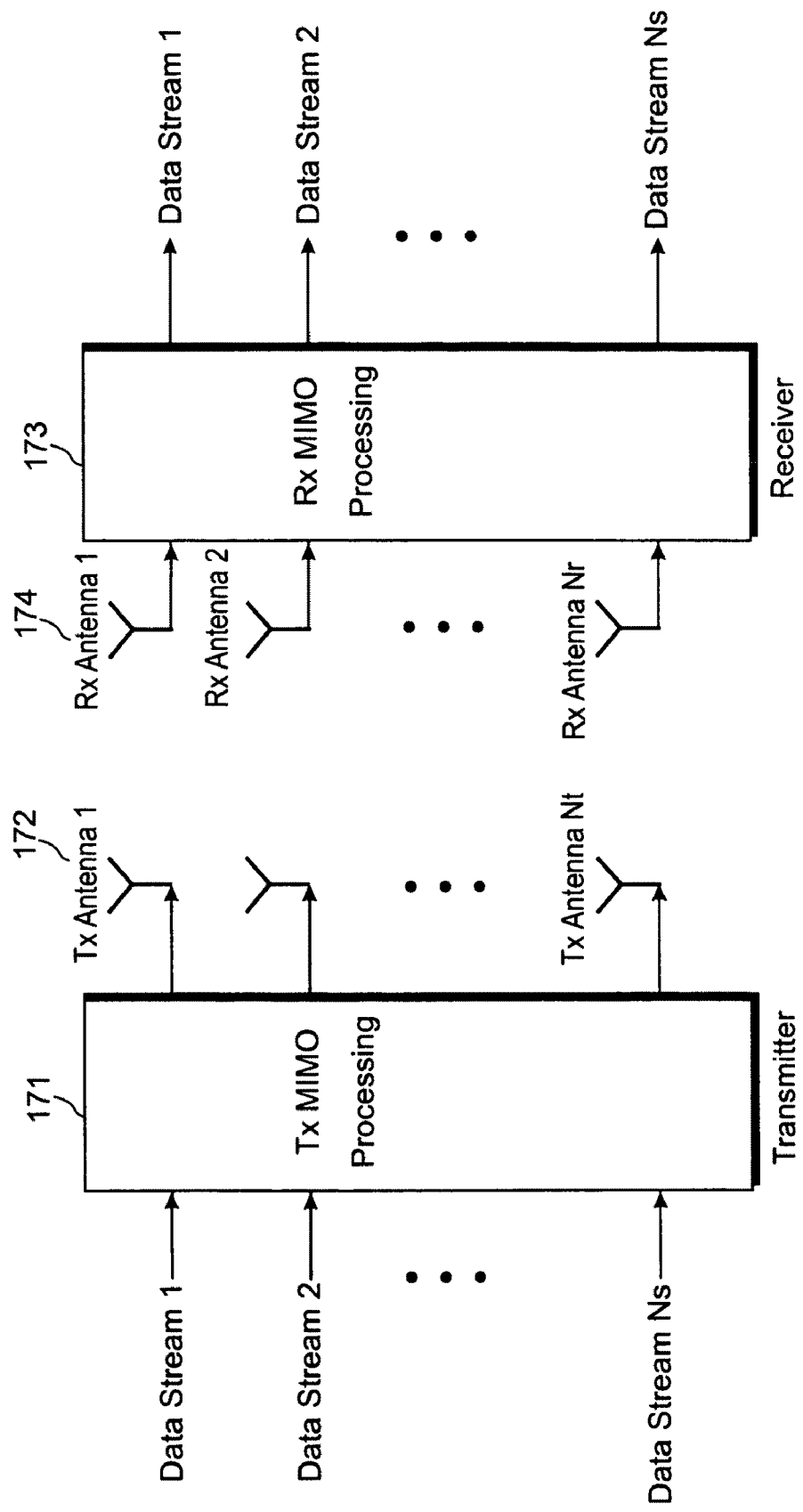
FIG. 7 is an illustration of a Multiple Input Multiple Output (MIMO) system.
Figure 8:
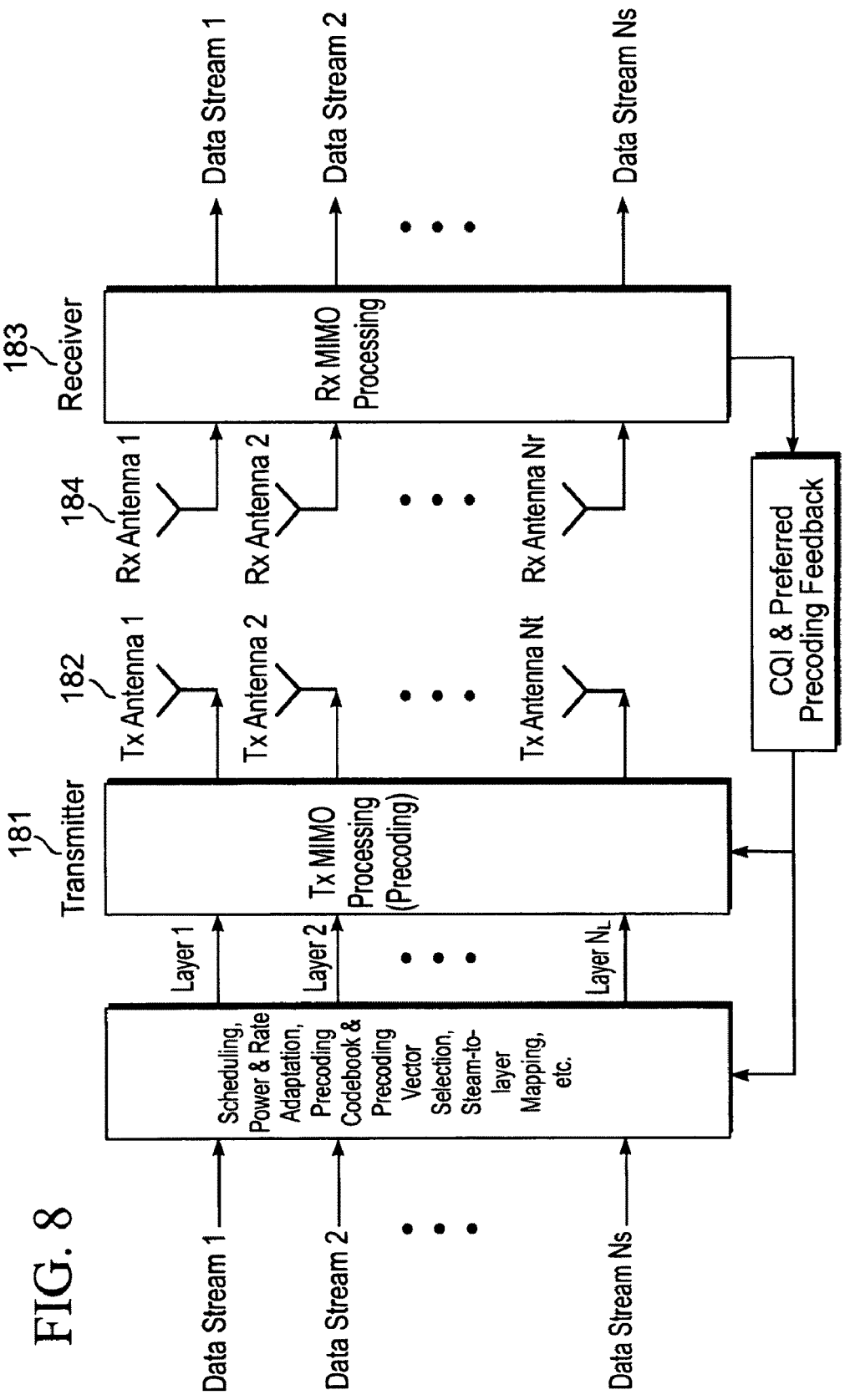
FIG. 8 is an illustration of a precoded MIMO system.

When the channel is favorable, e.g., the mobile speed is low, it is possible to use closed-loop MIMO scheme to improve system performance. In a closed-loop MIMO systems, the receivers feedback the channel condition and/or preferred Tx MIMO processing schemes. The transmitter utilizes this feedback information, together with other considerations such as scheduling priority, data and resource availability, to jointly optimize the transmission scheme. A popular closed loop MIMO scheme is called MIMO precoding. With precoding, the transmit data streams are pre-multiplied by a matrix before being passed on to the multiple transmit antennas. As shown in FIG. 6, assume there are Nt transmit antennas and Nr receive antennas. Denote the channel between the Nt transmit antennas and the Nr receive antennas as H. Therefore H is an Nt×Nr matrix. If the transmitter has knowledge about H, the transmitter can choose the most advantageous transmission scheme according to H. For example, if maximizing throught is the goal, the precoding matrix can be chosen to be the right singluar matrix of H, if the knowledge of H is available at the transmitter. By doing so, the effective channel for the multiple data streams at the receiver side can be diagonalized, eliminating the interference between the multiple data streams. However, the overhead required to feedback the exact value of H is often prohibitive. In order to reduce feedback overhead, a set of precoding matrices are defined to quantize the space of the possible values that H could substantiate. With the quantization, a receiver feeds back the preferred precoding scheme, normally in the form of the index of the preferred precoding matrix, the rank, and the indices of the preferred precoding vectors. The receiver may also feed back the associated CQI values for the preferred precoding scheme.

Another perspective of a MIMO system is whether the multiple data streams for transmission are encoded separately or encoded together. If all the layers for transmission are encoded together, we call it a single codeword (SCW) MIMO system. And we call it a multiple codeword (MCW) MIMO system otherwise. In the LTE downlink system, when single user MIMO (SU-MIMO) is used, up to 2 codewords can be transmitted to a single UE. In the case that 2 codewords are transmitted to a UE, the UE needs to acknowledge the two codewords separately. Another MIMO technique is called spatial division multiple access (SDMA), which is also referred to as multi-user MIMO (MU-MIMO) sometimes. In SDMA, multiple data streams are encoded separately and transmitted to different intended receivers on the same time-frequency resources. By using different spatial signature, e.g., antennas, virtual antennas, or precoding vectors, the receivers will be able to distinguish the multiple data streams. Moreover, by scheduling a proper group of receivers and choosing the proper spatial signature for each data stream based on channel state information, the signal of interest can be enhanced while the other signals can be enhanced for multiple receivers at the same time. Therefore the system capacity can be improved. Both single user MIMO (SU-MIMO) and multi-user MIMO (MU-MIMO) are adopted in the downlink of LTE. MU-MIMO is also adopted in the uplink of LTE while SU-MIMO for LTE uplink is still under discussion.

Figure 9:
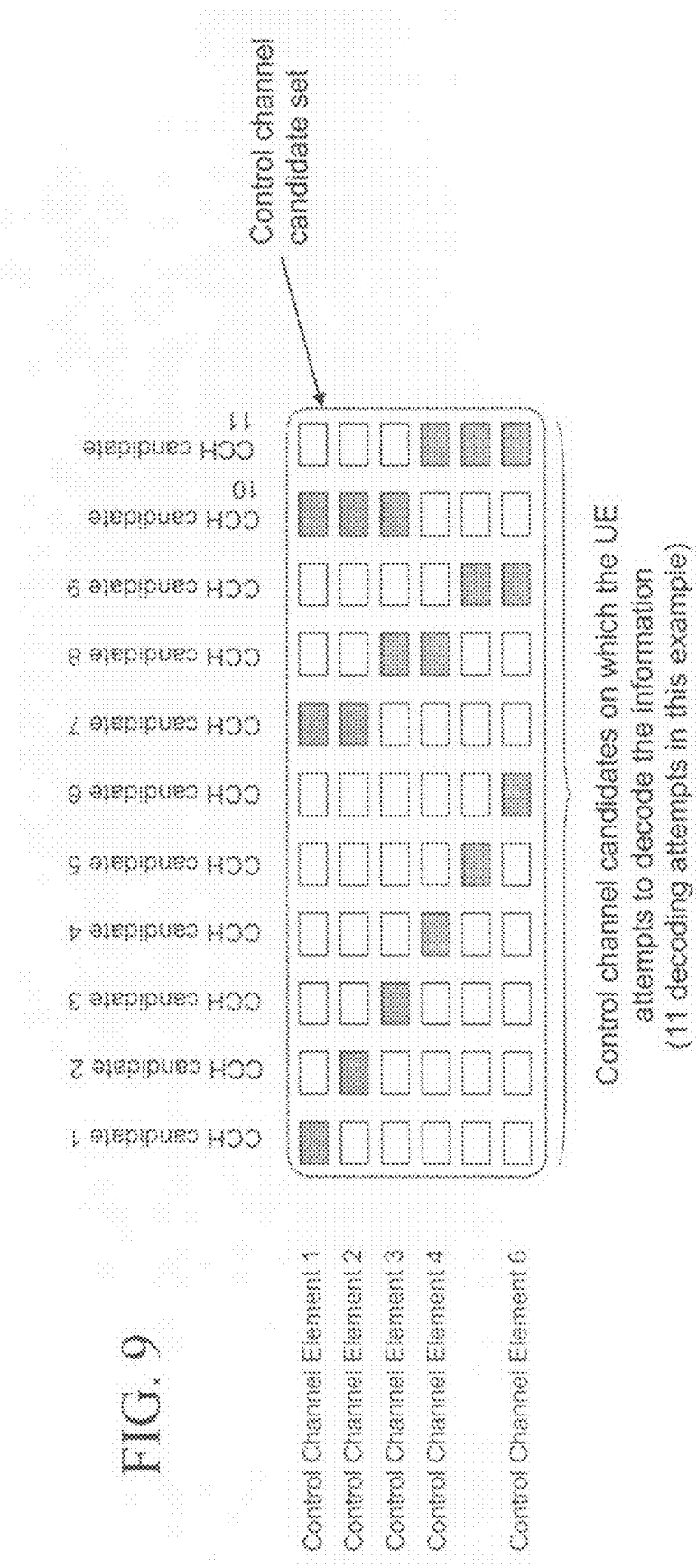
FIG. 9 is an illustration of LTE downlink control channel elements.

In LTE systems, some resources, namely control channel elements, are reserved for downlink control channel transmission. Control channel candidate set can be constructed based on the control channel elements reserved for downlink control channels. Each downlink control channel can be transmitted on one of the control channel candidate set. An example of control channel elements and control channel candidate set is shown in FIG. 9. In this example, 11 control channel candidate sets can be constructed on 6 control channel elements. In the rest of the document, we will refer to these control channel candidate sets as control channel resource sets, or simply, resource sets.

Figure 10:
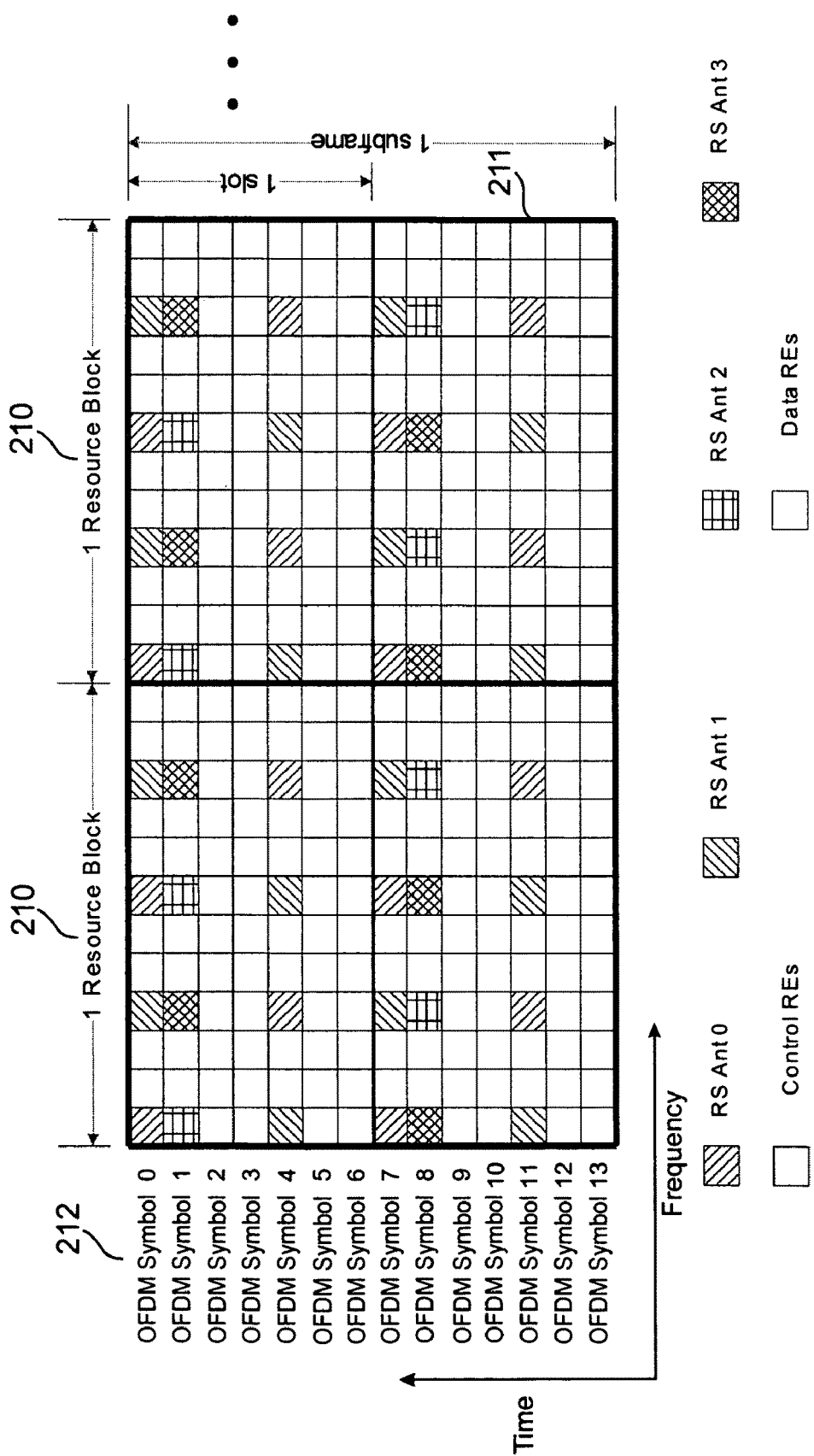
FIG. 10 is an illustration of LTE downlink subframe structure.

The downlink subframe structure in a 3GPP LTE system is shown in FIG. 10. In the 3GPP LTE system, a time and frequency resource can be divided into a plurality of resource blocks 210 (RB). Each resource block 210 can be further divided into a plurality of resource elements 211 in a time and frequency domain. As shown in FIG. 10, a single OFDM symbol can be transmitted using a row of resource elements corresponding to the same period of time. In a typical configuration, each subframe is 1 ms long, containing 14 OFDM symbols. Assume the OFDM symbols in a subframe are indexed from 0 to 13. Reference symbols (RS) for antenna 0 and 1 are located in OFDM symbol 0, 4, 7, and 11. If present, reference symbols (RS) for antennas 2 and 3 are located in OFDM symbol 2 and 8. Control channel signals, including Control Channel Format Indicator (CCFI), acknowledgement signal (ACK), packet data control channel (PDCCH) signal, are transmitted in the first one, or two, or three OFDM symbols. The number of OFDM symbols used for control channel signals is indicated by CCFI. Data channel signals, i.e., Physical Downlink Shared Channel (PDSCH) signals, are transmitted in other OFDM symbols.

In this invention, we propose methods and apparatus to provide robust mapping from control channel and data channel to resources in OFDM systems.

Aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive. The invention is illustrated by way of example, and not by way of limitation, in the figures of the accompanying drawings. In the following illustrations, we use the downlink subframe in 3GPP LTE system as an example. However, the techniques illustrated here can certainly be applied to uplink subframe structure, and in other systems whenever applicable.

Figure 11:
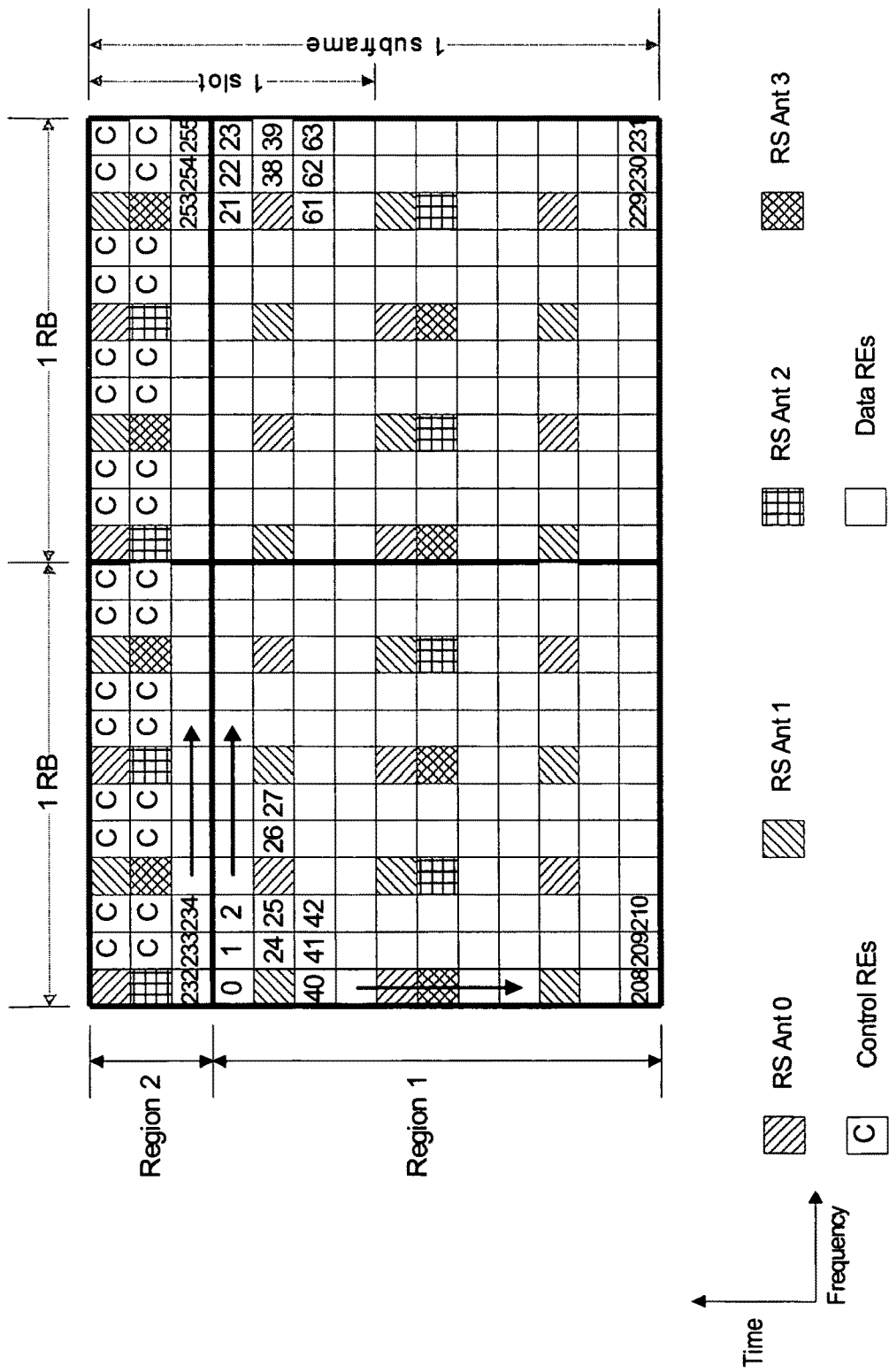
FIG. 11 illustrates a mapping scheme according to a first embodiment of the principles of the present invention.

FIG. 11 illustrates a scheme for mapping modulation symbols into a plurality of resource elements in an LTE downlink subframe according to a first embodiment of the principles of the present invention. For illustration purpose, 14 OFDM symbols in the LTE downlink subframe are indexed from 0 to 13. The control channel signals may occupy the first one, or two, or three OFDM symbols while the data channels may occupy the OFDM symbols that are not occupied by control channels. The LTE downlink subframe can be divided into Region 1 consisting of the resource elements corresponding to OFDM symbols 3 through 13, and Region 2 consisting of the resource elements corresponding to OFDM symbol 0, 1, and 2. Note here for ease of illustration, we assume control channels and data channels are not transmitted in the same OFDM symbol. Nevertheless, all the embodiments in this invention are applicable to the case where control channels and data channels do multiplex in the same OFDM symbol. In general, Region 1 can be defined as the collection of resource elements in a subframe that are used by data channel transmission regardless of the value of certain control channel information carried in the said subframe, e.g., Control Channel Format Indicator (CCFI). Region 2 can be defined as the collection of resource elements in a subframe that may be used by data channel transmission if the said resource elements are not used by other overhead channels, which is indicated by certain control channel information carried in the said subframe, e.g., CCFI.

Note there may be multiple data channel transmissions in a subframe that are multiplexed in the frequency domain using Orthogonal Frequency Division Multiple Access (OFDMA). For one data channel, assume there are $N_1$ resource elements available in Region 1 and $N_2$ resource elements available in Region 2. The availability of the resource elements for data transmission in Region 1 consisting of OFDM symbols 3 through 13 is independent of any control channel information. The availability of the resource elements for data transmission in Region 2 may be, however, dependent upon some control channel information. In the first embodiment of LTE downlink subframe, the availability of the resource elements for data transmission in OFDM symbols 0, 1, and 2 in Region 2 depends on the value of CCFI. For example, if CCFI indicates OFDM symbol 0 and 1 in Region 2 are used for control channel signal transmission, then only resource elements in OFDM symbol 2 are available for data transmission.

Figure 12:
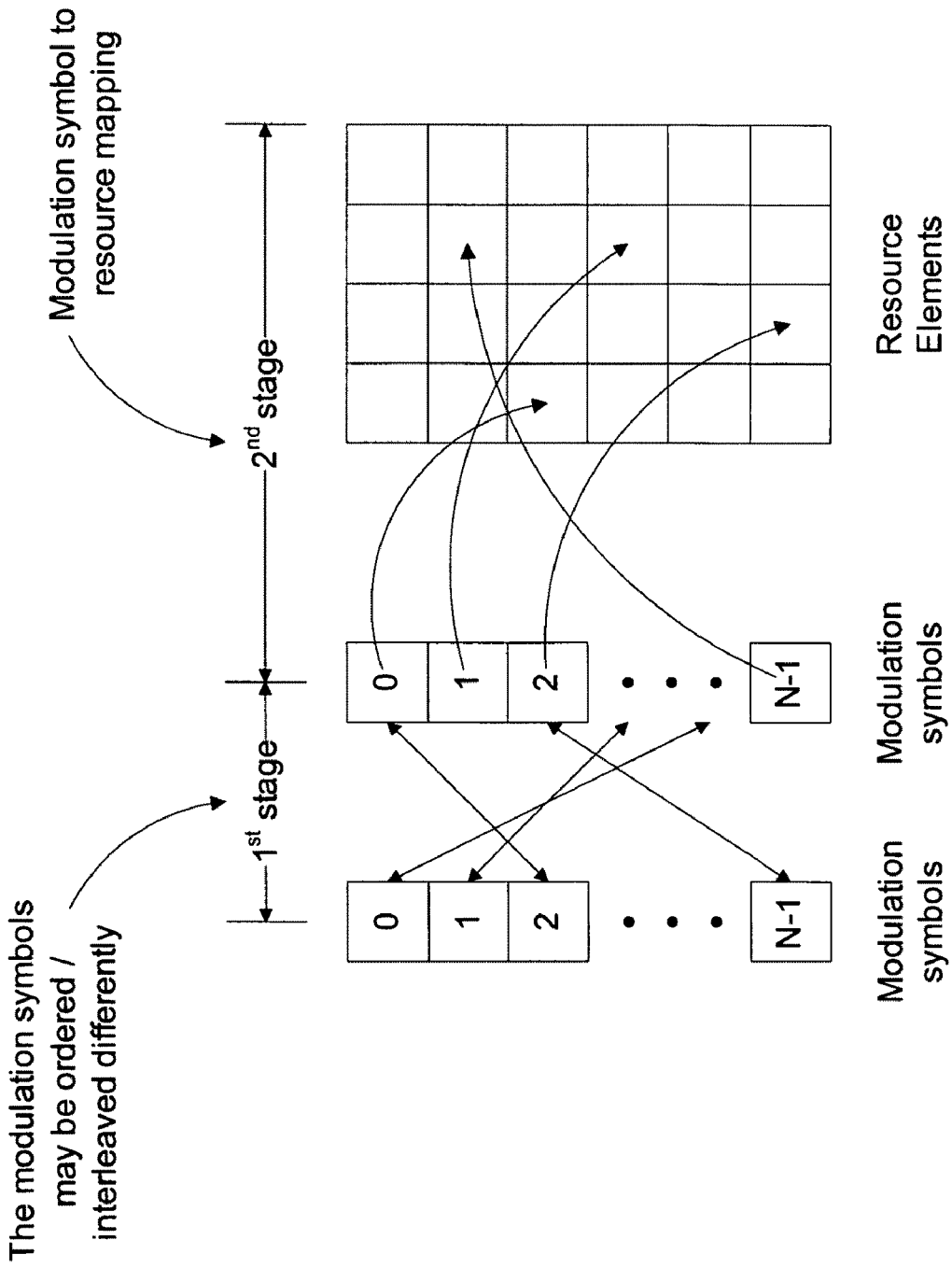
FIG. 12 illustrates an interleaving scheme and a mapping scheme according to the first embodiment of the principles of the present invention.

For the easy of illustration, we number the modulation symbols that need to be mapped to resource elements from 0 to N−1, where $N=N_1+N_2$. FIG. 12 illustrates the scheme for interleaving modulation symbols in a first stage and mapping the interleaved modulation symbols into a plurality of resource elements in a second stage according to the first embodiment of the principles of the present invention. For the ease of illustration, the description in this invention can be viewed as the second stage operation in FIG. 12 that illustrates the mapping from modulation symbols to resources assuming a natural order or numbering of the modulation symbols. It is certainly straightforward for a person with ordinary skill in the art, however, to apply the techniques in this invention to cases where the modulation symbols are not in the natural order. As shown in FIG. 12, by adding the first stage of modulation symbol ordering or interleaving, the techniques described in this invention can be applied to the case of modulation symbols with a different order. Also note that in some other cases, the techniques described in this invention can be combined with other processing. For example, one might describe the mapping from modulation symbols to resource elements jointly for the first stage and the second stage operations as shown in FIG. 12 without departing from the disclosure of the invention.

In the first embodiment according to the principles of the invention, the method of mapping of a plurality of modulation symbols to a plurality of resource elements contemplates segregating the plurality of resource elements in a subframe into a plurality of resource regions. The mapping in at least one resource region in the said subframe is independent of certain control channel information carried in the said subframe, while the mapping of modulation symbols to resource elements in at least another resource region in the said subframe is dependent on the said control channel information carried in the said subframe. FIG. 11 shows an example of the first embodiment. As shown in FIG. 11, two resource blocks (RBs) are allocated to a data transmission. Note these two RBs does not need to be contiguous in frequency domain. Except the resources that are used for predefined overhead, e.g., reference signals (RSs), the other REs can be used for both control channel and data channel transmission. In this example, we assume control channel signals can only be transmitted in the first three OFDM symbols. And the allocation and size of the resources for control channel transmission is indicated by the control channel format indication (CCFI) that is carried by the control channel signals. The resource elements (REs) in these two RBs are divided into two regions.

Region 1 consists of REs corresponding to the last eleven OFDM symbols (i.e., OFDM symbols 3 through 11) in a subframe. Region 2 consists of REs corresponding to the first three OFDM symbols in a subframe. Note control and data are multiplexed in Region 2 and the allocation and size of the resources for control channel in Region 2 is indicated by CCFI. In other words, the allocation and size of the resources for data channel transmission in Region 2 depend on CCFI. Before entering the modulator as shown in FIG. 1, coded bits generated by information bits and channel coding scheme are rate matched, interleaved, and modulated for each transmission. The modulation symbols may be further channel-interleaved. The modulation symbols are mapped to the data REs (i.e., resource elements that are available fore data channel transmission) in Region 1 in a fashion that is independent of CCFI. For example, as shown in FIG. 11, modulation symbols are mapped to available data REs in a row-wise manner. Specifically, modulation symbols 0-23 are mapped to the 24 data REs in the 4-th OFDM symbol (i.e., OFDM symbol 3). Modulation symbols 24-39 are mapped to the 16 data REs in the 5-th OFDM symbol (i.e., OFDM symbol 4). Modulation symbols 208-231 are mapped to the 24 data REs in the 14-th OFDM symbol (i.e., OFDM symbol 13). Assume control channel (PDCCH) signals occupies the first 2 OFDM symbols (i.e., OFDM symbols 1 and 2), the REs in the third OFDM symbol can also be utilized for data channel transmission. Thus, modulation symbol 232-255 are mapped to the 24 available data REs in the third OFDM symbol (i.e., OFDM symbol 2). Note that further channel interleaving and other processing of these modulation symbols can be performed, if desired. Preferably, these processing should be limited to be within Region 2 to maintain the resource allocation and modulation symbol mapping in Region 1 to be independent of CCFI. Note the aforementioned mapping method is just an illustration, different resource allocation and modulation mapping methods can be applied without departing from the scope of this invention. The mapping from modulation symbols 0-231 to Region 1 in FIG. 11 can be any mapping, as long the mapping does not depend on CCFI. For example, we can map modulation symbols to REs in Region 1, starting from the last OFDM symbol. In that case, modulation symbols 0-23 are mapped to the last OFDM symbol (i.e., OFDM symbol 13); modulation symbol 24-47 are mapped to the second to last OFDM symbol (i.e., OFDM symbol 12); and modulation symbols 208-231 are mapped to the fourth OFDM symbol (i.e., OFDM symbol 1).

Figure 13:
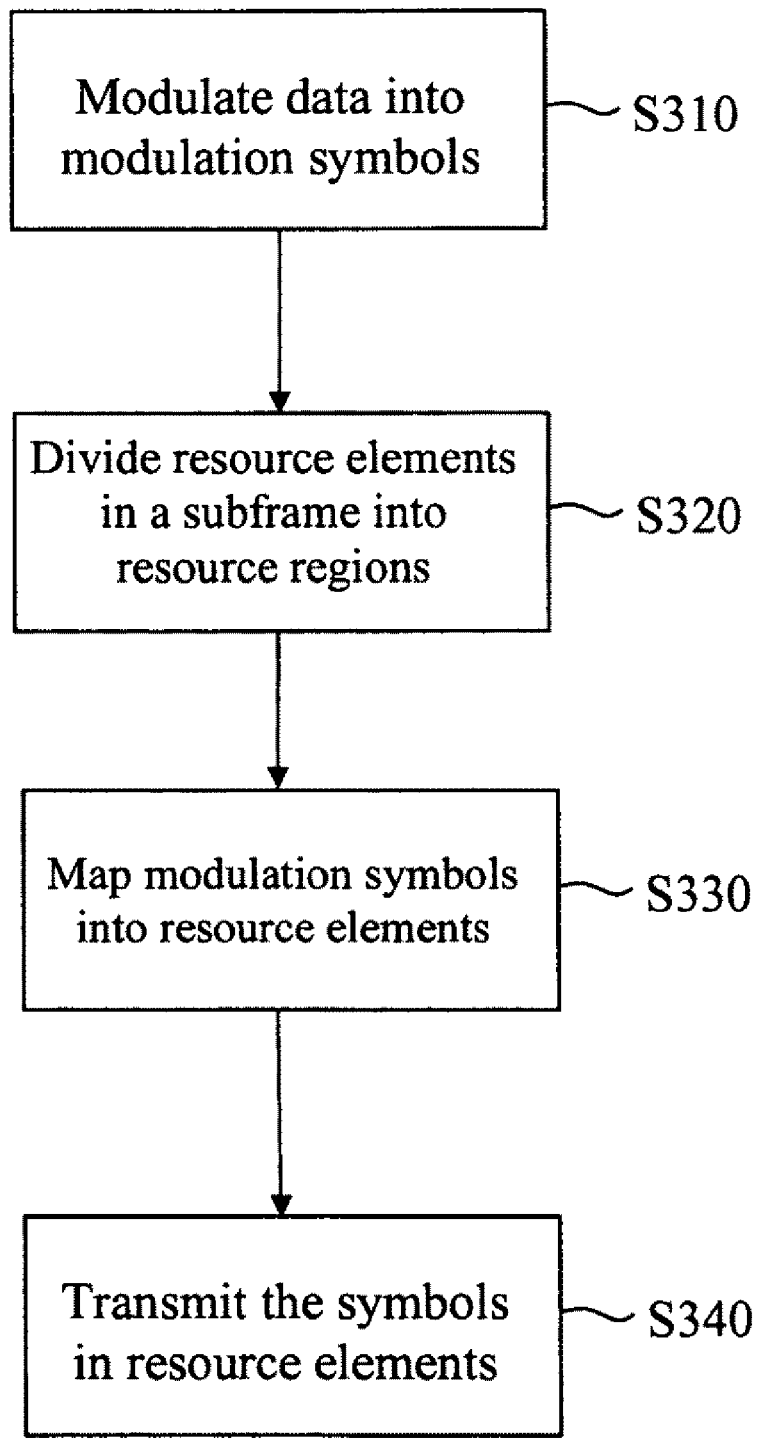
FIG. 13 illustrates a sequence of steps in a process of mapping modulation symbols according to the first embodiment of the principles of the present invention.

FIG. 13 illustrates a process for mapping modulation symbols according to the first embodiment of the principles of the present invention. First, at step S310, the data signals and the control signals to be transmitted are modulated into a plurality of modulation symbols including data symbols and control symbols. At step 320, the available resource elements for transmission in a subframe are divided to Region 1 and Region 2. At step 330, the modulation symbols are mapped into Region 1 and Region 2. Specifically, the mapping of modulation symbols into Region 1 is independent of the CCFI information carried in the control signals, and the mapping of modulation symbols into Region 2 is dependent upon the CCFI information carried in the control signals. Finally, at step 340, the modulation symbols mapped into the resource elements are transmitted via a plurality of antennas.

Figure 14:
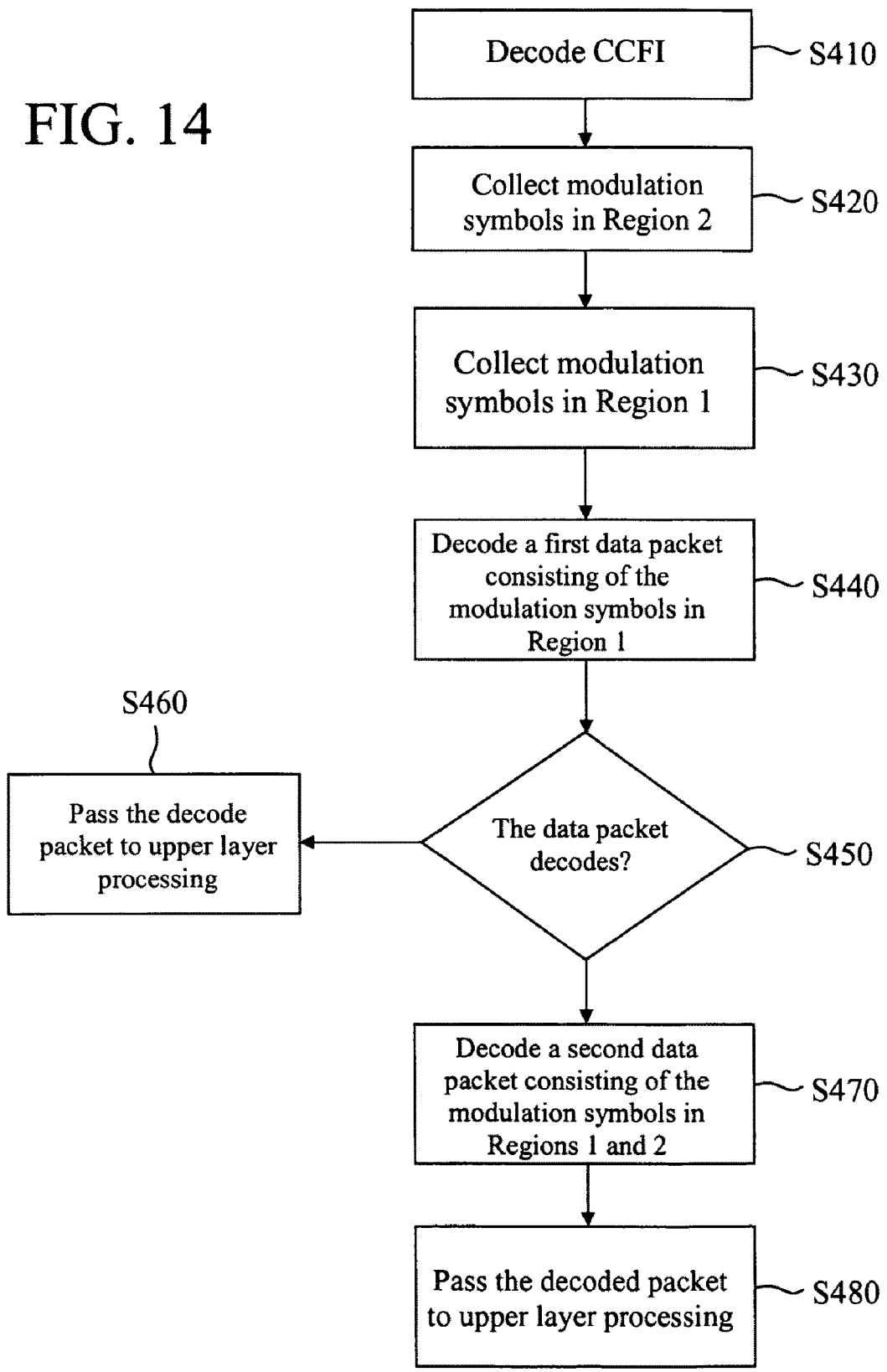
FIG. 14 illustrates a sequence of steps in a process of decoding modulation symbols according to a second embodiment of the principles of the present invention.

In a second embodiment according to the principles of the present invention, an operation of a receiver of the multiple-region resource mapping is illustrated in FIG. 14. For illustration purpose, the example as shown in FIG. 11 is used. At step S410, the receiver first decodes the CCFI information that is carried by the control channel signals. Based on the detected CCFI, the receiver can figure out which resource elements are allocated for data channel transmission in Region 2. At step S420, the receiver collects the received modulation symbols on available data REs in Region 2 according to the mapping from modulation symbols to data REs in Region 2. The mapping scheme may be pre-defined before the transmission process is started. Alternatively, the transmitter may transmit a control channel signal containing the information regarding the mapping scheme. At step S430, the receiver also collects the modulation symbols on available data REs in Region 1 to produce a first data packet according to the mapping scheme from modulation symbols to data REs in Region 1. The receiver will then attempt to decode the first data packet consisting of the modulation symbols from Region 1 only at step S440. At step S450, the receiver checks whether the first data packet decodes by using cyclic redundancy check (CRC) function. If the first data packet decodes, i.e., cyclic redundancy check (CRC) checks, then the receiver can pass the decoded packet to upper layer for further processing at step S460. Otherwise, at step S470, the receiver produces a second data packet consisting of the modulation symbols in both Region 1 and Region 2 and attempt to decode the second data packet. At step 480, the receiver passes the decoded packet to upper layer for further processing at step S460. Alternatively, the receiver can first attempt to decode the data packet with modulation symbols in both Region 1 and Region 2. If the decoding is successful, i.e., CRC checks, then the receiver can pass the decoded packet to upper layer for further processing. Otherwise, the receiver will attempt to decode the data packet with the modulation symbols in Region 1 only. Alternatively, erasure detection or CRC can be applied to the detection of the CCFI. In the case that the receiver does not successfully detect the CCFI, i.e., if CCFI erasure or CCFI detection error occurs, the receiver only uses modulation symbols in Region 1 to decode the packet. Otherwise, the receiver uses modulation symbols in both Region 1 and Region 2 to decode the packet.

In a third embodiment according to the principles of the present invention, the modulation symbols $0, 1, \ldots, N_1-1$ are mapped to Region 1 and modulation symbols $N_1, N_1+1, \ldots, N-1$ are mapped to Region 2. Again using FIG. 12 as an example, there are 256 modulation symbols in total for this data transmission. The first 232 modulation symbols are mapped to REs in Region 1 and the other 24 modulation symbols are mapped to REs in Region 2. Note that the number of modulation symbols that can be transmitted equals to the number of REs available for data transmission. With the two-region approach, regardless of the value of CCFI, the first $N_1$ modulation symbols are mapped to the $N_1$ REs in Region 1. The number of available data REs and the number of modulation symbols transmitted in Region 2, however, depend on the value of CCFI.

Figure 15:
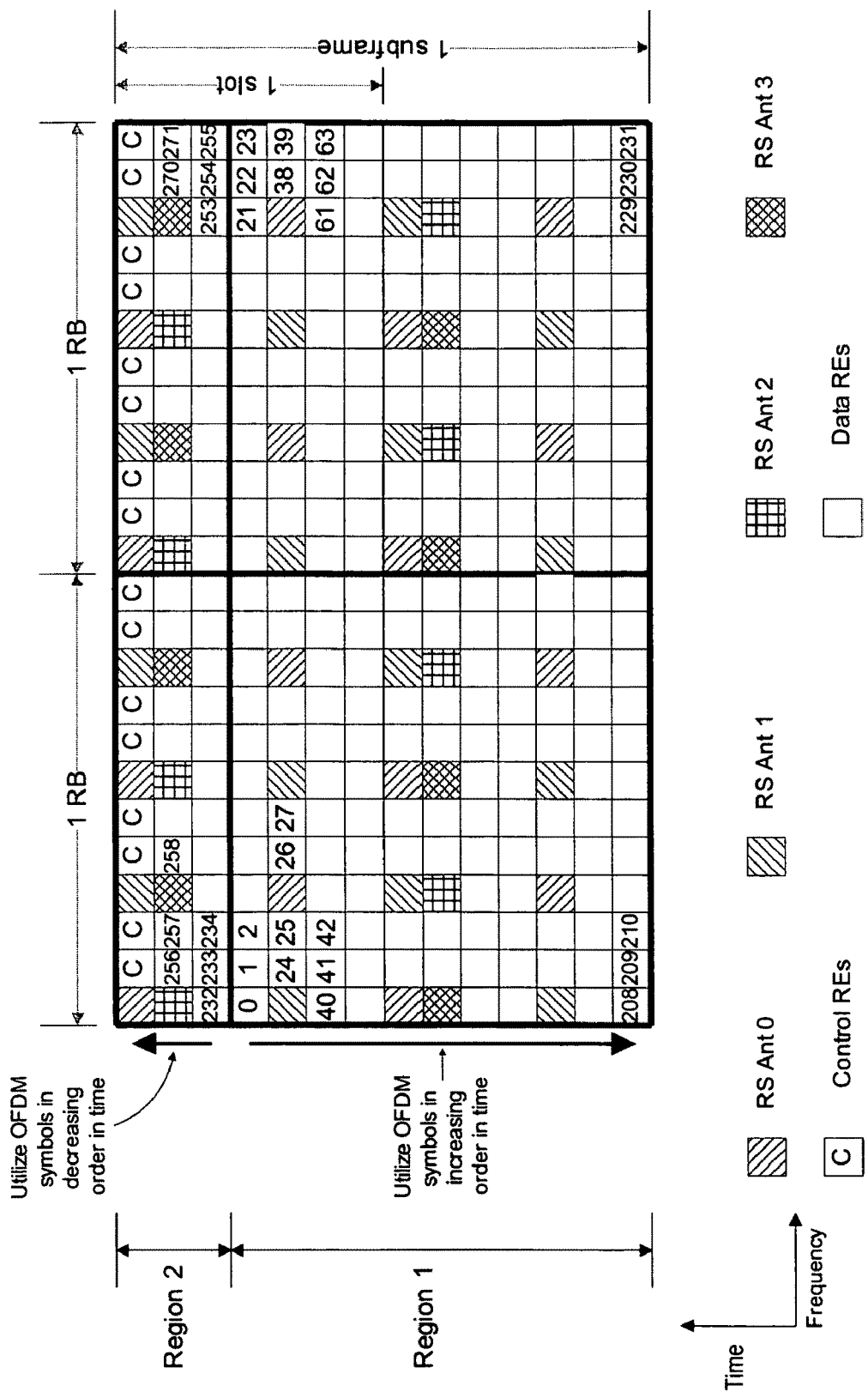
FIG. 15 illustrates a mapping scheme according to a fourth embodiment of the principles of the present invention.

In a fourth embodiment according to the principles of the present invention, the method of mapping of modulation symbols to resource elements in a subframe contemplates segregating the resource elements in the subframe into a plurality of resource regions with the mapping of the modulation symbols in at least one resource region in the subframe utilizing the OFDM symbols in an increasing order while the mapping of the modulation symbols to resource elements in at least another resource region in the said subframe utilizing the OFDM symbols in a decreasing order. For example, in an LTE downlink subframe, the mapping of modulation symbols in Region 1 starts from REs in OFDM symbol 3 while the OFDM symbols are filled in an increasing order while the mapping of modulation symbols in Region 2 starts from REs in OFDM symbol 2 while the OFDM symbols are filled in a decreasing order. In other words, the order that the OFDM symbols are filled with modulation symbols are 3, 4, 5, 6, 7, 8, 9, 10, 11, 12, 13, 2, 1, 0. Note that the availability of REs in Region 2 (OFDM symbol 0, 1, 2) depends on the control channel format indicator (CCFI). This mapping method is especially useful when there are multiple code blocks in the data transmission. By mapping code blocks to OFDM symbols that are ordered sequentially in time domain, the receiver can start decoding of some code block before receiving the whole subframe. The fourth embodiment is also illustrated in FIG. 15. Again, the order of mapping of modulation symbols to REs in frequency domain can be changed without departing from this invention. For example, FIG. 15 shows modulation symbol 0 to 23 are mapped to REs in OFDM symbol 3 in sequential order along the frequency axis. However, the order of mapping in frequency domain can be changed, e.g., by frequency domain interleaving, without departing from the scope of this invention.

Figure 16:
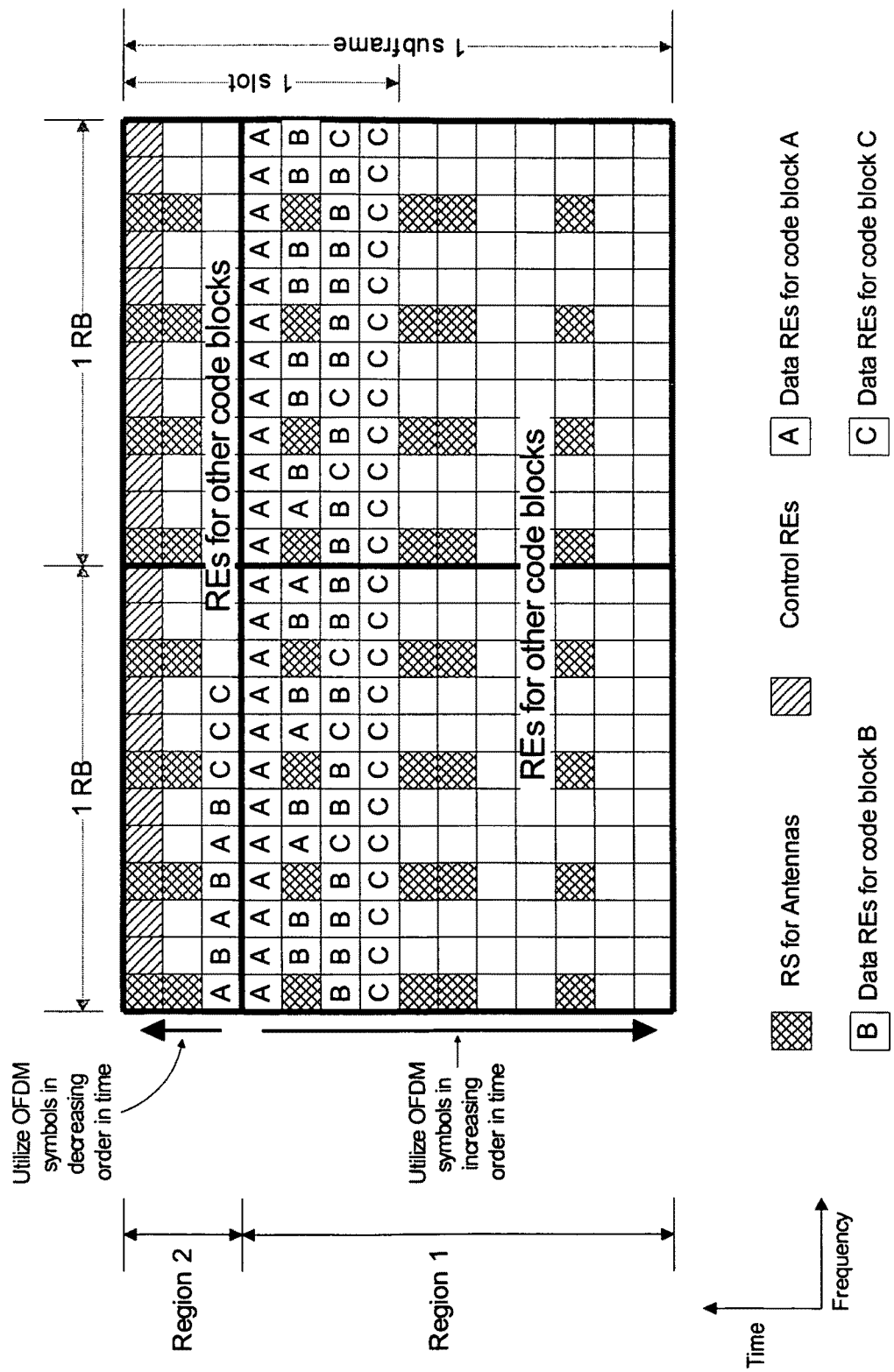
FIG. 16 illustrates a mapping scheme according to a fifth embodiment of the principles of the present invention.

In a fifth embodiment according to the principles of the present invention, the mapping of modulation symbols of each code block to resource elements in at least one resource region is independent of certain control channel information carried in the said subframe. An example is illustrated in FIG. 16. In this example, modulation symbols that carry coded bits for code block A are transmitted on OFDM symbol 3 and 4 in Region 1, and OFDM symbol 2 in Region 2. Modulation symbols that carry coded bits for code block B are transmitted on OFDM symbol 4 and 5 in Region 1, and OFDM symbol 2 in Region 2. Modulation symbols that carry coded bits for code block C are transmitted on OFDM symbol 5 and 6 in Region 1, and OFDM symbol 2 in Region 2. By doing so, the receiver can start decoding some code blocks before receiving the whole subframe. For example, the receiver can start decoding of code block A after receiving and demodulating data REs in OFDM symbol 2, 3, and 4

In a sixth embodiment according to the principles of the present invention, the mapping of modulation symbols within each code block into resource elements within at least one resource region being independent of certain control channel information carried in the said subframe while the mapping of modulation symbols of each code block into resource elements within at least another resource region being dependent of certain control channel information carried in the said subframe. Again using FIG. 16 as an example, the number and location of data REs for code block A, B, and C in Region 2 depend on the CCFI information, while the number and location of data REs for code block A, B, and C in Region 1 does not depend on the CCFI information.

In a seventh embodiment according to the principles of the present invention, the number of data REs in at least one resource region among a plurality of resource regions is allocated roughly equally among the multiple code blocks to ensure about equal error protection on each code block. Since there is only one CRC for the whole transport block, it is important for each code block to receive as much error protection as possible. Note that the number of available data REs may not be divisible by the number of code blocks. So, we can only ensure roughly equal number of data REs assigned to each code block. Assuming there are $N_1$ modulation symbols available for data transmission in Region 1 and $N_2$ modulation symbols available for data transmission in Region 2. Assume there are $N_{seg}$ code blocks. Define $\lceil x \rceil$ as the smallest integer that is larger than or equal to x. Define $\lfloor x \rfloor$ as the largest integer that is smaller than or equal to x. Define x mod y is the remainder of x/y. As an example, the number of data REs assigned to code block j in Region 1, $M_{j,1}$, could be given by $$M_{j,1} = \begin{cases} \left\lceil \frac{N_1}{N_{seg}} \right\rceil, & 0 \leq j < N_1 \bmod N_{seg} \\ \left\lfloor \frac{N_1}{N_{seg}} \right\rfloor, & N_1 \bmod N_{seg} \leq j < N_{seg} \end{cases} \quad (1)$$

Similarly, the number of data REs assigned to code block j in Region 2, $M_{j,2}$, could be given by $$M_{j,2} = \begin{cases} \left\lceil \frac{N_2}{N_{seg}} \right\rceil, & 0 \leq j < N_2 \bmod N_{seg} \\ \left\lfloor \frac{N_2}{N_{seg}} \right\rfloor, & N_2 \bmod N_{seg} \leq j < N_{seg} \end{cases} \quad (2)$$

Note that in this embodiment, we assign a slightly larger number, i.e., $\lceil N_1/N_{seg} \rceil$, of data REs to the code blocks at the beginning of Region 1 and a slightly smaller number, i.e., $\lfloor N_1/N_{seg} \rfloor$, of data REs to the code blocks in the end of Region 1. This scheme works well if the code blocks at the beginning may have larger sizes than the code blocks in the end. Alternatively, we could assign the slightly smaller number of data REs to the code blocks at the beginning and the slightly larger number of data REs to the code blocks in the end. This scheme works well if the code blocks in the beginning may have smaller sizes than the code blocks in the end. In that case, the number of data REs assigned to code block j in Region 1, $M_{j,1}$, could be given by $$M_{j,1} = \begin{cases} \left\lfloor \frac{N_1}{N_{seg}} \right\rfloor, & 0 \leq j < (N_{seg} - N_1 \bmod N_{seg}) \\ \left\lceil \frac{N_1}{N_{seg}} \right\rceil, & (N_{seg} - N_1 \bmod N_{seg}) \leq j < N_{seg} \end{cases} \quad (3)$$

Similarly, the number of data REs assigned to code block j in Region 2, $M_{j,2}$, could be given by $$M_{j,2} = \begin{cases} \left\lfloor \frac{N_2}{N_{seg}} \right\rfloor, & 0 \leq j < (N_{seg} - N_2 \bmod N_{seg}) \\ \left\lceil \frac{N_2}{N_{seg}} \right\rceil, & (N_{seg} - N_2 \bmod N_{seg}) \leq j < N_{seg} \end{cases} \quad (4)$$

Note this embodiment is still applicable when there is only one resource region, i.e., all data REs belong to the same resource region. For example, in the case of only one resource region, the number of data resource elements is almost equally allocated among the multiple code blocks. The number of data resource elements of code block j can be given by Equation (1). Alternatively, the number of data resource elements of code block j can be given by Equation (3). Note that for the case of only one resource region, NJ is the total number of resource elements.

In an eighth embodiment according to the principles of the present invention, the number of coded bits, or the number of modulation positions in modulation symbols, in at least one resource region is allocated roughly equally among the multiple code blocks to ensure about equal error protection on each code block. For example, assume the modulation order is L, e.g., L=4 for 16 QAM. A modulation position is one of the L bits that an L-th order modulation symbol carries. For example, a QPSK modulation symbol (L=2) has 2 modulation positions, each one corresponds to a bit that is carried by the modulation symbol. A 16-QAM modulation symbol (L=4) can carry 4 bits. Thus there are 4 modulation positions in a 16-QAM modulation symbol. Therefore, a total number of $N_1 \times L$ coded bits can be transmitted in Region 1. A total number of $N_2 \times L$ coded bits can be transmitted in Region 2. The resource assignment can be done on a coded-bit basis. As an example, the number of coded bits assigned to code block j in Region 1, $M_{j,1}$, could be given by $$M_{j,1} = \begin{cases} \left\lceil \frac{N_1 \times L}{N_{seg}} \right\rceil, & 0 \le j < (N_1 \times L) \bmod N_{seg} \\ \left\lfloor \frac{N_1 \times L}{N_{seg}} \right\rfloor, & (N_1 \times L) \bmod N_{seg} \le j < N_{seg} \end{cases} \quad (5)$$

Similarly, the number of coded bits assigned to code block j in Region 2, $M_{j,2}$, could be given by $$M_{j,2} = \begin{cases} \left\lceil \frac{N_2 \times L}{N_{seg}} \right\rceil, & 0 \le j < (N_2 \times L) \bmod N_{seg} \\ \left\lfloor \frac{N_2 \times L}{N_{seg}} \right\rfloor, & (N_2 \times L) \bmod N_{seg} \le j < N_{seg} \end{cases} \quad (6)$$

Note that in this embodiment, we assign a slightly larger number, i.e., $\lceil N_1 \times L/N_{seg} \rceil$, of coded bits to the code blocks at the beginning and a slightly smaller number, i.e., $\lfloor N_1 \times L/N_{seg} \rfloor$, of coded bits to the code blocks in the end. This scheme works well if the code blocks at the beginning may have larger sizes than the code blocks in the end. Alternatively, we could assign the slightly smaller number of coded bits to the code blocks at the beginning and the slightly larger number of coded bits to the code blocks in the end. This scheme works well if the code blocks in the beginning may have smaller sizes than the code blocks in the end. In that case, the number of coded bits assigned to code block j in Region 1, $M_{j,1}$, could be given by $$M_{j,1} = \begin{cases} \left\lfloor \frac{N_1 \times L}{N_{seg}} \right\rfloor, & 0 \le j < (N_{seg} - (N_1 \times L) \bmod N_{seg}) \\ \left\lceil \frac{N_1 \times L}{N_{seg}} \right\rceil, & (N_{seg} - (N_1 \times L) \bmod N_{seg}) \le j < N_{seg} \end{cases} \quad (7)$$

Similarly, the number of data REs assigned to code block j in Region 2, $M_{j,2}$, could be given by $$M_{j,2} = \begin{cases} \left\lfloor \frac{N_2 \times L}{N_{seg}} \right\rfloor, & 0 \le j < (N_{seg} - (N_2 \times L) \bmod N_{seg}) \\ \left\lceil \frac{N_2 \times L}{N_{seg}} \right\rceil, & (N_{seg} - (N_2 \times L) \bmod N_{seg}) \le j < N_{seg} \end{cases} \quad (8)$$

Again, note this embodiment is still applicable when there is only one resource region, i.e., all data REs belong to the same resource region. For example, in the case of only one resource region, the number of coded bit is almost equally allocated among the multiple code blocks. The number of coded bits assigned to code block j can be given by Equation (5). Alternatively, the number of coded bits assigned to code block j can be given by Equation (7). Note that for the case of only one resource region, $N_1$ is the total number of resource elements.

In a ninth embodiment according to the principles of the present invention, the number of data REs in at least one resource region is allocated to achieve roughly equal coding rate among the multiple code blocks to ensure about equal error protection on each code block. For example, the number of data REs assigned to code block j in Region 1, $M_{j,1}$, could be given by $$M_{j,1} = \begin{cases} \left\lfloor \frac{N_1 \times K_j}{\sum_{i=0}^{N_{seg}-1} K_i} \right\rfloor + 1, & 0 \le j < X_1 \\ \left\lfloor \frac{N_1 \times K_j}{\sum_{i=0}^{N_{seg}-1} K_i} \right\rfloor, & X_1 \le j < N_{seg} \end{cases} \quad (9)$$

where $K_j$ is the information block size of the code block j and $$X_1 = N_1 - \sum_{j=0}^{N_{seg}-1} \left\lfloor \frac{N_1 \times K_j}{\sum_{i=0}^{N_{seg}-1} K_i} \right\rfloor \quad (10)$$

is the number such that $$\sum_{j=0}^{N_{seg}-1} M_{j,1} = N_1.$$

Note, although not required, the definition of $K_j$ preferably includes tail bits.

Similarly, the number of data REs assigned to code block j in Region 2, $M_{j,2}$, could be given by $$M_{j,2} = \begin{cases} \left\lfloor \frac{N_2 \times K_j}{\sum_{i=0}^{N_{seg}-1} K_i} \right\rfloor + 1, & 0 \le j < X_2 \\ \left\lfloor \frac{N_2 \times K_j}{\sum_{i=0}^{N_{seg}-1} K_i} \right\rfloor, & X_2 \le j < N_{seg} \end{cases} \quad (11)$$

where $$X_2 = N_2 - \sum_{j=0}^{N_{seg}-1} \left\lfloor \frac{N_2 \times K_j}{\sum_{i=0}^{N_{seg}-1} K_i} \right\rfloor \quad (12)$$

is the number such that $$\sum_{j=0}^{N_{seg}-1} M_{j,2} = N_2.$$

Note that in this embodiment, we assign a slightly larger number of data REs to the code blocks at the beginning and a slightly smaller number of data REs to the code blocks in the end. This scheme works well if the code blocks at the beginning may have larger sizes than the code blocks in the end. Alternatively, we could assign the slightly smaller number of data REs to the code blocks at the beginning and the slightly larger number of data REs to the code blocks in the end. This scheme works well if the code blocks in the beginning may have smaller sizes than the code blocks in the end. In that case, the number of data REs assigned to code block j in Region 1, $M_{j,1}$, could be given by $$M_{j,1} = \begin{cases} \left\lfloor \frac{N_1 \times K_j}{\sum_{i=0}^{N_{seg}-1} K_i} \right\rfloor, & 0 \le j < N_{seg} - X_1 \\ \left\lfloor \frac{N_1 \times K_j}{\sum_{i=0}^{N_{seg}-1} K_i} \right\rfloor + 1, & N_{seg} - X_1 \le j < N_{seg} \end{cases} \quad (13)$$

Similarly, the number of data REs assigned to code block j in Region 2, $M_{j,2}$, could be given by $$M_{j,2} = \begin{cases} \left\lfloor \frac{N_2 \times K_j}{\sum_{i=0}^{N_{seg}-1} K_i} \right\rfloor, & 0 \le j < N_{seg} - X_2 \\ \left\lfloor \frac{N_2 \times K_j}{\sum_{i=0}^{N_{seg}-1} K_i} \right\rfloor + 1, & N_{seg} - X_2 \le j < N_{seg} \end{cases} \quad (14)$$

Again, note this embodiment is still applicable when there is only one resource region, i.e., all data REs belong to the same resource region. For example, in the case of only one resource region, the number of data REs is allocated to achieve roughly equal coding rate. The number of data REs assigned to code block j can be given by Equation (9). Alternatively, the number of data REs assigned to code block j can be given by Equation (13). Note that for the case of only one resource region, $N_1$ is the total number of resource elements.

In a tenth embodiment according to the principles of the present invention, the number of coded bits, or the number of modulation positions in modulation symbols, in at least one resource region is allocated to achieve roughly equal coding rate among the multiple code blocks to ensure about equal error protection on each code block. For example, the number of coded bits assigned to code block j in Region 1, $M_{j,1}$, could be given by $$M_{j,1} = \begin{cases} \left\lfloor \frac{N_1 \times L \times K_j}{\sum_{i=0}^{N_{seg}-1} K_i} \right\rfloor + 1, & 0 \le j < Y_1 \\ \left\lfloor \frac{N_1 \times L \times K_j}{\sum_{i=0}^{N_{seg}-1} K_i} \right\rfloor, & Y_1 \le j < N_{seg} \end{cases} \quad (15)$$

where $$Y_1 = N_1 \times L - \sum_{j=0}^{N_{seg}-1} \left\lfloor \frac{N_1 \times L \times K_j}{\sum_{i=0}^{N_{seg}-1} K_i} \right\rfloor \quad (16)$$

is the number such that $$\sum_{j=0}^{N_{seg}-1} M_{j,1} = N_1 \times L.$$

Similarly, the number of coded bits assigned to code block j in Region 2, $M_{j,2}$, could be given by $$M_{j,2} = \begin{cases} \left\lfloor \frac{N_2 \times L \times K_j}{\sum_{i=0}^{N_{seg}-1} K_i} \right\rfloor + 1, & 0 \le j < Y_2 \\ \left\lfloor \frac{N_2 \times L \times K_j}{\sum_{i=0}^{N_{seg}-1} K_i} \right\rfloor, & Y_2 \le j < N_{seg} \end{cases} \quad (17)$$

where $$Y_2 = N_2 \times L - \sum_{j=0}^{N_{seg}-1} \left\lfloor \frac{N_2 \times L \times K_j}{\sum_{i=0}^{N_{seg}-1} K_i} \right\rfloor \quad (18)$$

is the number such that $$\sum_{j=0}^{N_{seg}-1} M_{j,2} = N_2 \times L.$$

Note that in this embodiment, we assign a slightly larger number of coded bits to the code blocks at the beginning and a slightly smaller number of coded bits to the code blocks in the end. This scheme works well if the code blocks at the beginning may have larger sizes than the code blocks in the end. Alternatively, we could assign the slightly smaller number of coded bits to the code blocks at the beginning and the slightly larger number of coded bits to the code blocks in the end. This scheme works well if the code blocks in the beginning may have smaller sizes than the code blocks in the end. In that case, the number of coded bits assigned to code block j in Region 1, $M_{j,1}$, could be given by $$M_{j,1} = \begin{cases} \left\lfloor \frac{N_1 \times L \times K_j}{\sum_{i=0}^{N_{seg}-1} K_i} \right\rfloor, & 0 \le j < N_{seg} - Y_1 \\ \left\lfloor \frac{N_1 \times L \times K_j}{\sum_{i=0}^{N_{seg}-1} K_i} \right\rfloor + 1, & N_{seg} - Y \le j < N_{seg} \end{cases} \quad (19)$$

Similarly, the number of coded bits assigned to code block j in Region 2, $M_{j,2}$, could be given by $$M_{j,2} = \begin{cases} \left\lfloor \dfrac{N_2 \times L \times K_j}{\sum_{i=0}^{N_{seg}-1} K_i} \right\rfloor, & 0 \le j < N_{seg} - Y_2 \\ \left\lfloor \dfrac{N_2 \times L \times K_j}{\sum_{i=0}^{N_{seg}-1} K_i} \right\rfloor + 1, & N_{seg} - Y_2 \le j < N_{seg} \end{cases} \quad (20)$$

Again, note this embodiment is still applicable when there is only one resource region, i.e., all data REs belong to the same resource region. For example, in the case of only one resource region, the number of coded bits is allocated to achieve roughly equal coding rate among the multiple code blocks. The number of coded bits assigned to code block j can be given by Equation (15). Alternatively, the number of data REs assigned to code block j can be given by Equation (19). Note that for the case of only one resource region, $N_1$ is the total number of resource elements.

In an eleventh embodiment according to the principles of the present invention, only REs in Region 1 are used for certain data transmissions. In this case, the danger of performance degradation due to CCFI error can be completely removed, assuming downlink resource assignment and transmission format are know to the receiver already.

What is claimed is:

1. A method, comprising the steps of:
   dividing a transmission resource in a subframe into a plurality of equal duration resource elements in a time and frequency domain;
   segregating the plurality of resource elements into a plurality of resource regions, comprising at least one first resource region and at least one second resource region, each of the first resource regions and the second resource regions comprising at least one multiplexing symbol, each multiplexing symbol corresponding to a time unit, and each multiplexing symbol comprising a plurality of resource elements corresponding to respective frequency sub-carriers;
   modulating information to be transmitted to generate a sequence of modulation symbols at a transmitter;
   mapping the sequence of modulation symbols into the plurality of resource elements in the plurality of resource regions, with,
      the mapping of the modulation symbols in the at least one first resource region being independent of a certain control channel information that is carried in said time domain subframe, and
      the mapping of the modulation symbols in the at least one second resource region being dependent upon said certain control channel information that is carried in said subframe; and
   transmitting the modulation symbols via at least one antennas using the respective corresponding resource elements to a receiver.

2. The method of claim 1, comprised of the certain control channel information being a control channel format indication.

3. The method of claim 1, comprising interleaving the sequence of modulation symbols before mapping the modulation symbols into the resource elements.

4. The method of claim 1, comprised of said certain control channel information being carried in a control channel signal that is transmitted using the resource elements in the at least one second resource region via the transmitter to the receiver.

5. The method of claim 1, comprised of the sequence of modulation symbols being sequentially mapped into resource elements within the plurality of multiplexing symbols in the resource regions starting from a multiplexing symbol having a smallest index in the time domain.

6. The method of claim 5, comprised of the multiplexing symbol being an Orthogonal Frequency Division Multiplexing symbol.

7. The method of claim 1, comprised of the mapping of the sequence of modulation symbols starting from the resource elements within the at least one first resource region, and if the number of the modulation symbols being more than the resource elements in the at least one first resource region, mapping the remaining modulation symbols into the resource elements within the at least one second resource region.

8. The method of claim 1, comprised of the sequence of modulation symbols being sequentially mapped into resource elements within the plurality of multiplexing symbols in the at least one first resource region and the at least one second resource region, with, in each resource region, the multiplexing symbols being mapped in an increasing order starting from a multiplexing symbol having a smallest index in the time domain.

9. The method of claim 8, comprised of, after mapping the modulation symbols into the resource elements within the multiplexing symbols, the modulation symbols within each multiplexing symbols being interleaved in the frequency domain.

10. The method of claim 1, comprised of the sequence of modulation symbols being sequentially mapped into resource elements within the plurality of multiplexing symbols in the at least one first resource region and the at least one second resource region, with,
    in the first resource region, the multiplexing symbols being mapped in a decreasing order starting from a multiplexing symbol having a largest index in the time domain in the said first resource region, and
    in the second resource region, the multiplexing symbols being mapped in an increasing order starting from a multiplexing symbol having a smallest index in the time domain in the said second resource region.

11. The method of claim 10, comprised of, after mapping the modulation symbols into the resource elements within the multiplexing symbols, the modulation symbols within each multiplexing symbols being interleaved in the frequency domain.

12. The method of claim 1, comprised of the sequence of modulation symbols being sequentially mapped into resource elements within the plurality of multiplexing symbols in the at least one first resource region and the at least one second resource region, with,
    in the first resource region, the multiplexing symbols being mapped in an increasing order starting from a multiplexing symbol having a smallest index in the time domain in the said first resource region, and
    in the second resource region, the multiplexing symbols being mapped in a decreasing order starting from a multiplexing symbol having a largest index in the time domain in the said second resource region.

13. The method of claim 12, comprised of, after mapping the modulation symbols into the resource elements within the multiplexing symbols, the modulation symbols within each multiplexing symbols being interleaved in the frequency domain.

14. The method of claim 1, further comprising:
calculating the number of available resource elements in the at least one first resource region to obtain a first number;
calculating the number of available resource elements in the at least one second resource region to obtain a second number;
mapping the first number of modulation symbols into the resource elements within the at least one first resource region; and
mapping the second number of modulation symbols into the resource elements within the at least one second resource region.

15. The method of claim 1, further comprising the steps of:
transmitting a control channel signal carrying said certain control channel information via the transmitter to the receiver;
decoding at the receiver the control channel signal to derive said certain control channel information;
determining which resource elements within the at least one second resource region are used for the transmission of the modulation symbols;
collecting the modulation symbols transmitted in a resource region selected from among the at least one first resource region to generate a first data packet;
decoding the first data packet;
determining whether the first data packet decodes correctly; and
if the decoding of the first data packet fails, recursively collecting the modulation symbols transmitted in said resource region and other resource regions selected from among the at least one first resource region and the at least one second resource region, and decoding the collected modulation symbols until the collected modulation symbols decodes.

16. The method of claim 15, comprised of:
if the decoding of the control channel signal fails, recursively collecting and decoding the modulation symbols transmitted in said resource region and other resource regions selected from among the at least one first resource region until the collected modulation symbols decodes.

17. A method for transmission, the method comprising the steps of:
dividing a transmission resource in a time domain subframe into a plurality of equal duration resource elements in a time and frequency domain;
segregating the plurality of resource elements into a plurality of resource regions, comprising at least one first resource region and at least one second resource region, each of the first resource regions and the second resource regions comprising at least one multiplexing symbol, each multiplexing symbol corresponding to a time slot, and each multiplexing symbol comprising a plurality of resource elements corresponding to respective frequency sub-carriers;
encoding information to be transmitted to generated a plurality of code blocks, each code block including a plurality of coded bits;
modulating the plurality of coded bits in the code blocks to generate a sequence of modulation symbols at a transmitter;
mapping at least one modulation symbol in each code block into the resource elements in the at least one first resource region, with the mapping being independent of a certain control channel information that is carried in said time domain subframe; and
transmitting the modulation symbols via a plurality of antennas using the respective corresponding resource elements to a receiver.

18. The method of claim 17, comprised of mapping at least one modulation symbol in each code block into the resource elements in the at least one second resource region, with the mapping being dependent on the certain control channel information that is carried in said time domain subframe.

19. The method of claim 17, further comprising assigning roughly equal number of resource elements in one of the at least one first resource region to each of the plurality of code blocks.

20. The method of claim 19, comprised of the number of the resource elements in said one of the at least one first resource region assigned to code block j being established by:

$$M_{j,1} = \begin{cases} \left\lceil \frac{N_1}{N_{seg}} \right\rceil, & 0 \leq j < N_1 \bmod N_{seg} \\ \left\lfloor \frac{N_1}{N_{seg}} \right\rfloor, & N_1 \bmod N_{seg} \leq j < N_{seg} \end{cases}$$

where $N_{seg}$ is the number of the code blocks, $N_1$ is the number of the resource elements in said one of the at least one first resource region, with the number of the resource elements assigned to the code blocks having an index j with $0 \leq j < (N_1 \bmod N_{seg})$ being more than the number of the resource elements assigned to the code blocks having an index i with $(N_1 \bmod N_{seg}) \leq i < N_{seg}$.

21. The method of claim 19, comprised of the number of the resource elements in said one of the at least one first resource region assigned to code block j being established by:

$$M_{j,1} = \begin{cases} \left\lfloor \frac{N_1}{N_{seg}} \right\rfloor, & 0 \leq j < (N_{seg} - N_1 \bmod N_{seg}) \\ \left\lceil \frac{N_1}{N_{seg}} \right\rceil, & (N_{seg} - N_1 \bmod N_{seg}) \leq j < N_{seg} \end{cases}$$

where $N_{Seg}$ is the number of the code blocks, $N_1$ is the number of the resource elements in said one of the at least one first resource region, with the number of the resource elements assigned to the code blocks having an index j with $0 \leq j < (N_{seg} - N_1 \bmod N_{seg})$ being less than the number of the resource elements assigned to the code blocks having an index i with $(N_{seg} - N_1 \bmod N_{seg}) \leq i < N_{seg}$.

22. The method of claim 17, further comprising:
mapping at least one modulation symbol in each code block into the resource elements in the at least one second resource region, with the mapping being dependent on the certain control channel information that is carried in said time domain subframe; and
assigning roughly equal number of resource elements in one of the at least one second resource region to each of the plurality of code blocks.

23. The method of claim 22, comprised of the number of the resource elements in said one of the at least one second resource region assigned to code block j being established by:

$$M_{j,2} = \begin{cases} \left\lceil \dfrac{N_2}{N_{seg}} \right\rceil, & 0 \le j < N_2 \bmod N_{seg} \\ \left\lfloor \dfrac{N_2}{N_{seg}} \right\rfloor, & N_2 \bmod N_{seg} \le j < N_{seg} \end{cases}$$

where $N_{seg}$ is the number of the code blocks, $N_2$ is the number of resource elements in said one of the at least one second resource region, with the number of the resource elements assigned to the code blocks having an index j with $0 \le j < (N_2 \bmod N_{seg})$ being more than the number of the resource elements assigned to the code blocks having an index i with $(N_2 \bmod N_{seg}) \le i < N_{seg}$.

24. The method of claim 22, comprised of the number of resource elements in said one of the at least one second resource region assigned to code block j being established by:

$$M_{j,2} = \begin{cases} \left\lfloor \dfrac{N_2}{N_{seg}} \right\rfloor, & 0 \le j < (N_{seg} - N_2 \bmod N_{seg}) \\ \left\lceil \dfrac{N_2}{N_{seg}} \right\rceil, & (N_{seg} - N_2 \bmod N_{seg}) \le j < N_{seg} \end{cases}$$

where $N_{seg}$ is the number of the code blocks, $N_2$ is the number of resource elements in said one of the at least one second resource region, with the number of the resource elements assigned to the code blocks having an index j with $0 \le j < (N_{seg} - N_1 \bmod N_{seg})$ being less than the number of the resource elements assigned to the code blocks having an index i with $N_{seg} - N_1 \bmod N_{seg} \le i < N_{seg}$.

25. The method of claim 17, further comprising assigning roughly equal number of coded bits in one of the at least one first resource region to each of the plurality of code blocks.

26. The method of claim 25, comprised of the number of the coded bits in said one of the at least one first resource region assigned to code block j being established by $$M_{j,1} = \begin{cases} \left\lceil \dfrac{N_1 \times L}{N_{seg}} \right\rceil, & 0 \le j < (N_1 \times L) \bmod N_{seg} \\ \left\lfloor \dfrac{N_1 \times L}{N_{seg}} \right\rfloor, & (N_1 \times L) \bmod N_{seg} \le j < N_{seg} \end{cases}$$

where $N_{seg}$ is the number of the code blocks, $N_1$ is the number of the resource elements in said one of the at least one first resource region, L is a modulation order, with the number of the coded bits in the code blocks having an index j with $0 \le j < ((N_{1 \times L}) \bmod N_{seg})$ being more than the number of the coded bits in the code blocks having an index i with $((N_1 \times L) \bmod N_{seg}) \le i < N_{seg}$.

27. The method of claim 25, comprised of the number of the coded bits in said one of the at least one first resource region assigned to code block j being established by $$M_{j,1} = \begin{cases} \left\lfloor \dfrac{N_1 \times L}{N_{seg}} \right\rfloor, & 0 \le j < (N_{seg} - (N_1 \times L) \bmod N_{seg}) \\ \left\lceil \dfrac{N_1 \times L}{N_{seg}} \right\rceil, & (N_{seg} - (N_1 \times L) \bmod N_{seg}) \le j < N_{seg} \end{cases}$$

where $N_{seg}$ is the number of the code blocks, $N_1$ is the number of the resource elements in said one of the at least one first resource region, L is a modulation order, with the number of the coded bits in the code blocks having an index j with $0 \le j < ((N_{seg} - N_1 \times L) \bmod N_{seg})$ being less than the number of the coded bits in the code blocks having an index i with $((N_{seg} - N_1 \times L) \bmod N_{seg}) \le i < N_{seg}$.

28. The method of claim 17, further comprising:
mapping at least one modulation symbol in each code block into the resource elements in the at least one second resource region, with the mapping being dependent on the certain control channel information that is carried in said time domain subframe; and
assigning roughly equal number of coded bits in one of the at least one second resource region to each of the plurality of code blocks.

29. The method of claim 28, comprised of the number of the coded bits in said one of the at least one second resource region assigned to code block j being established by $$M_{j,2} = \begin{cases} \left\lceil \dfrac{N_2 \times L}{N_{seg}} \right\rceil, & 0 \le j < (N_2 \times L) \bmod N_{seg} \\ \left\lfloor \dfrac{N_2 \times L}{N_{seg}} \right\rfloor, & (N_2 \times L) \bmod N_{seg} \le j < N_{seg} \end{cases}$$

where $N_{seg}$ is the number of the code blocks, $N_2$ is the number of the resource elements in said one of the at least one second resource region, L is a modulation order, with the number of the coded bits in the code blocks having an index j with $0 \le j < ((N_2 \times L) \bmod N_{seg})$ being more than the number of the coded bits in the code blocks having an index i with $((N_2 \times L) \bmod N_{seg}) \le i < N_{seg}$.

30. The method of claim 28, comprised of the number of coded bits in said one of the at least one second resource region assigned to code block j being established by $$M_{j,2} = \begin{cases} \left\lfloor \dfrac{N_2 \times L}{N_{seg}} \right\rfloor, & 0 \le j < (N_{seg} - (N_2 \times L) \bmod N_{seg}) \\ \left\lceil \dfrac{N_2 \times L}{N_{seg}} \right\rceil, & (N_{seg} - (N_2 \times L) \bmod N_{seg}) \le j < N_{seg} \end{cases}$$

where $N_{seg}$ is the number of the code blocks, $N_2$ is the number of resource elements in said one of the at least one second resource region, L is a modulation order, with the number of the coded bits in the code blocks having an index j with $0 \le j < ((N_{seg} - N_2 \times L) \bmod N_{seg})$ being less than the number of the coded bits in the code blocks having an index i with $((N_{seg} - N_2 \times L) \bmod N_{seg}) \le i < N_{seg}$.

31. The method of claim 17, further comprising assigning a selected number of resource elements in one of the at least one first resource region to each of the plurality of code blocks to obtain roughly equal coding rate among the plurality of code blocks.

32. The method of claim 31, comprised of the number of resource elements in said one of the at least one first resource region assigned to code block j being established by:

$$M_{j,1} = \begin{cases} \left\lfloor \dfrac{N_1 \times K_j}{\sum_{i=0}^{N_{seg}-1} K_i} \right\rfloor + 1, & 0 \le j < X_1 \\ \left\lfloor \dfrac{N_1 \times K_j}{\sum_{i=0}^{N_{seg}-1} K_i} \right\rfloor, & X_1 \le j < N_{seg} \end{cases}$$

where $N_{seg}$ is the number of the code blocks, $N_1$ is the number of the resource elements in said one of the at least one first resource region, $K_j$ is the information block size of code block j, and $$X_1 = N_1 - \sum_{j=0}^{N_{seg}-1} \left\lfloor \frac{N_1 \times K_j}{\sum_{i=0}^{N_{seg}-1} K_i} \right\rfloor,$$

with the number of the resource elements assigned to the code blocks having an index j with $0 \leq j < X_1$ being more than the number of the resource elements assigned to the code blocks having an index i with $X_1 \leq i < N_{seg}$.

33. The method of claim 32, comprised of $K_j$ including the number of tail bits.

34. The method of claim 31, comprised of the number of resource elements in said one of the at least one first resource region assigned to code block j being established by:

$$M_{j,1} = \begin{cases} \left\lfloor \frac{N_1 \times K_j}{\sum_{i=0}^{N_{seg}-1} K_i} \right\rfloor, & 0 \leq j < N_{seg} - X_1 \\ \left\lfloor \frac{N_1 \times K_j}{\sum_{i=0}^{N_{seg}-1} K_i} \right\rfloor + 1, & N_{seg} - X_1 \leq j < N_{seg} \end{cases}$$

where $N_{seg}$ is the number of the code blocks, $N_1$ is the number of the resource elements in said one of the at least one first resource region, $K_j$ is the information block size of code block j, and $$X_1 = N_1 - \sum_{j=0}^{N_{seg}-1} \left\lfloor \frac{N_1 \times K_j}{\sum_{i=0}^{N_{seg}-1} K_i} \right\rfloor,$$

with the number of the resource elements assigned to the code blocks having an index j with $0 \leq j < (N_{seg} - X_1)$ being less than the number of the resource elements assigned to the code blocks having an index i with $(N_{seg} - X_1) \leq i < N_{seg}$.

35. The method of claim 34, comprised of $K_j$ include the number of tail bits.

36. The method of claim 17, further comprising:
mapping at least one modulation symbol in each code block into the resource elements in the at least one second resource region, with the mapping being dependent on the certain control channel information that is carried in said time domain subframe; and
assigning a selected number of resource elements in one of the at least one second resource region to each of the plurality of code blocks to obtain roughly equal coding rate among the plurality of code blocks.

37. The method of claim 36, comprised of the number of the resource elements in said one of the at least one second resource region assigned to code block j being established by:

$$M_{j,2} = \begin{cases} \left\lfloor \frac{N_2 \times K_j}{\sum_{i=0}^{N_{seg}-1} K_i} \right\rfloor + 1, & 0 \leq j < X_2 \\ \left\lfloor \frac{N_2 \times K_j}{\sum_{i=0}^{N_{seg}-1} K_i} \right\rfloor, & X_2 \leq j < N_{seg} \end{cases}$$

where $N_{seg}$ is the number of the code blocks, $N_2$ is the number of the resource elements in said one of the at least one second resource region, $K_j$ is the information block size of code block j, and $$X_2 = N_2 - \sum_{j=0}^{N_{seg}-1} \left\lfloor \frac{N_2 \times K_j}{\sum_{i=0}^{N_{seg}-1} K_i} \right\rfloor,$$

with the number of the resource elements assigned to the code blocks having an index j with $0 \leq j < X_2$ being more than the number of the resource elements assigned to the code blocks having an index i with $X_2 \leq i < N_{seg}$.

38. The method of claim 37, comprised of $K_j$ including the number of tail bits.

39. The method of claim 36, comprised of the number of the resource elements in said one of the at least one second resource region assigned to code block j being established by:

$$M_{j,2} = \begin{cases} \left\lfloor \frac{N_2 \times K_j}{\sum_{i=0}^{N_{seg}-1} K_i} \right\rfloor, & 0 \leq j < N_{seg} - X_2 \\ \left\lfloor \frac{N_2 \times K_j}{\sum_{i=0}^{N_{seg}-1} K_i} \right\rfloor + 1, & N_{seg} - X_2 \leq j < N_{seg} \end{cases}$$

where $N_{seg}$ is the number of the code blocks, $N_2$ is the number of the resource elements in said one of the at least one second resource region, $K_j$ is the information block size of code block j, and $$X_2 = N_2 - \sum_{j=0}^{N_{seg}-1} \left\lfloor \frac{N_2 \times K_j}{\sum_{i=0}^{N_{seg}-1} K_i} \right\rfloor,$$

with the number of the resource elements assigned to the code blocks having an index j with $0 \leq j < (N_{seg} - X_2)$ being less than the number of the resource elements assigned to the code blocks having an index i with $(N_{seg} - X_2) \leq i < N_{seg}$.

40. The method of claim 39, comprised of $K_j$ including the number of tail bits.

41. The method of claim 17, further comprising assigning a selected number of coded bits in one of the at least one first resource region to each of the plurality of code blocks to obtain roughly equal coding rate among the plurality of code blocks.

42. The method of claim 41, comprised of the number of the coded bits in said one of the at least one first resource region assigned to code block j being established by:

$$M_{j,1} = \begin{cases} \left\lfloor \dfrac{N_1 \times L \times K_j}{\sum_{i=0}^{N_{seg}-1} K_i} \right\rfloor + 1, & 0 \leq j < Y_1 \\ \left\lfloor \dfrac{N_1 \times L \times K_j}{\sum_{i=0}^{N_{seg}-1} K_i} \right\rfloor, & Y_1 \leq j < N_{seg} \end{cases}$$

where $N_{seg}$ is the number of the code blocks, $N_1$ is the number of the resource elements in said one of the at least one first resource region, $K_j$ is the information block size of code block j, and $$Y_1 = N_1 \times L - \sum_{j=0}^{N_{seg}-1} \left\lfloor \dfrac{N_1 \times L \times K_j}{\sum_{i=0}^{N_{seg}-1} K_i} \right\rfloor,$$

with the number of the coded bits in the code blocks having an index j with $0 \leq j < Y_1$ being more than the number of the coded bits in the code blocks having an index i with $Y_1 \leq i < N_{seg}$.

43. The method of claim 41, comprised of the number of the coded bits in said one of the at least one first resource region assigned to code block j being established by:

$$M_{j,1} = \begin{cases} \left\lfloor \dfrac{N_1 \times L \times K_j}{\sum_{i=0}^{N_{seg}-1} K_i} \right\rfloor, & 0 \leq j < N_{seg} - Y_1 \\ \left\lfloor \dfrac{N_1 \times L \times K_j}{\sum_{i=0}^{N_{seg}-1} K_i} \right\rfloor + 1, & N_{seg} - Y \leq j < N_{seg} \end{cases}$$

where $N_{seg}$ is the number of the code blocks, $N_1$ is the number of the resource elements in said one of the at least one first resource region, $K_j$ is the information block size of code block j, and $$Y_1 = N_1 \times L - \sum_{j=0}^{N_{seg}-1} \left\lfloor \dfrac{N_1 \times L \times K_j}{\sum_{i=0}^{N_{seg}-1} K_i} \right\rfloor,$$

with the number of the coded bits in the code blocks having an index j with $0 \leq j < (N_{seg} - Y_1)$ being less than the number of the coded bits in the code blocks having an index i with $(N_{seg} - Y_1) \leq i < N_{seg}$.

44. The method of claim 17, further comprising:
mapping at least one modulation symbol in each code block into the resource elements in the at least one second resource region, with the mapping being dependent on the certain control channel information that is carried in said time domain subframe; and
assigning a selected number of coded bits in one of the at least one second resource region to each of the plurality of code blocks to obtain roughly equal coding rate among the plurality of code blocks.

45. The method of claim 44, comprised of the number of coded bits in said one of the at least one second resource region assigned to code block j being established by:

$$M_{j,2} = \begin{cases} \left\lfloor \dfrac{N_2 \times L \times K_j}{\sum_{i=0}^{N_{seg}-1} K_i} \right\rfloor + 1, & 0 \leq j < Y_2 \\ \left\lfloor \dfrac{N_2 \times L \times K_j}{\sum_{i=0}^{N_{seg}-1} K_i} \right\rfloor, & Y_2 \leq j < N_{seg} \end{cases}$$

where $N_{seg}$ is the number of the code blocks, $N_2$ is the number of resource elements in said one of the at least one second resource region, $K_j$ is the information block size of code block j, and $$Y_2 = N_2 \times L - \sum_{j=0}^{N_{seg}-1} \left\lfloor \dfrac{N_2 \times L \times K_j}{\sum_{i=0}^{N_{seg}-1} K_i} \right\rfloor,$$

with the number of the coded bits in the code blocks having an index j with $0 \leq j < Y_2$ being more than the number of the coded bits in the code blocks having an index i with $Y_2 \leq i < N_{seg}$.

46. The method of claim 44, comprised of the number of coded bits in said one of the at least one second resource region assigned to code block j being established by:

$$M_{j,2} = \begin{cases} \left\lfloor \dfrac{N_2 \times L \times K_j}{\sum_{i=0}^{N_{seg}-1} K_i} \right\rfloor, & 0 \leq j < N_{seg} - Y_2 \\ \left\lfloor \dfrac{N_2 \times L \times K_j}{\sum_{i=0}^{N_{seg}-1} K_i} \right\rfloor + 1, & N_{seg} - Y_2 \leq j < N_{seg} \end{cases}$$

where $N_{seg}$ is the number of the code blocks, $N_2$ is the number of resource elements in said one of the at least one second resource region, $K_j$ is the information block size of code block j, and $$Y_2 = N_2 \times L - \sum_{j=0}^{N_{seg}-1} \left\lfloor \dfrac{N_2 \times L \times K_j}{\sum_{i=0}^{N_{seg}-1} K_i} \right\rfloor,$$

with the number of the coded bits in the code blocks having an index j with $0 \leq j < (N_{seg} - Y_2)$ being less than the number of the coded bits in the code blocks having an index i with $(N_{seg} - Y_2) \leq i < N_{seg}$.

* * * * *